US 9,118,358 B2

(12) United States Patent
Laroia et al.

(10) Patent No.: US 9,118,358 B2
(45) Date of Patent: Aug. 25, 2015

(54) METHODS AND APPARATUS FOR SELECTING BETWEEN MULTIPLE CARRIERS USING A SINGLE RECEIVER CHAIN TUNED TO A SINGLE CARRIER

(75) Inventors: Rajiv Laroia, Basking Ridge, NJ (US); Junyi Li, Bedminster, NJ (US); Frank A. Lane, Asbury, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1105 days.

(21) Appl. No.: 11/258,553

(22) Filed: Oct. 25, 2005

(65) Prior Publication Data

US 2006/0084404 A1    Apr. 20, 2006

Related U.S. Application Data

(63) Continuation of application No. 10/872,674, filed on Jun. 21, 2004, now Pat. No. 6,990,324.

(60) Provisional application No. 60/562,900, filed on Apr. 15, 2004.

(51) Int. Cl.
*H04B 1/06* (2006.01)
*H04B 7/00* (2006.01)
(Continued)

(52) U.S. Cl.
CPC .............. *H04B 1/005* (2013.01); *H04B 1/1027* (2013.01); *H04B 1/406* (2013.01); *H04B 17/327* (2015.01); *H04B 17/382* (2015.01)

(58) Field of Classification Search
USPC ......... 370/335, 331, 332, 333, 341, 431, 437; 455/266.1, 424, 425, 456.5, 456.6, 455/561, 550.1, 575.1, 452.2, 63.1, 67.1, 1, 455/132, 134, 135, 142, 143, 154.1, 166.1, 455/166.2, 176.1, 179.1, 180.1, 180.2, 455/188.1, 188.2, 226.2, 226.3, 266, 277.2, 455/273, 275, 437, 442, 525; 375/347, 349, 375/316, 200, 260, 344, 208, 346, 340

See application file for complete search history.

(56) References Cited

U.S. PATENT DOCUMENTS 4,388,496 A  *  6/1983  Miyamoto ................... 381/2
4,748,642 A  *  5/1988  Bertsche ..................... 375/340
(Continued)

FOREIGN PATENT DOCUMENTS

CN    1139502 A    1/1997
CN    1484877 A    3/2004
(Continued)

OTHER PUBLICATIONS

International Search Report and The Written Opinion of the International Searching Authority for PCT/US2004/34129, dated Oct. 24, 2005, pp. 1-7.
(Continued)

*Primary Examiner* — Ankur Jain
(74) *Attorney, Agent, or Firm* — Eric Ho

(57) ABSTRACT

Receivers accommodating carrier frequency selection methods in wireless communications systems employing multiple carrier frequencies are described. Although the receiver is tuned to a single band, an estimate of the channel quality corresponding to the currently used carrier and an alternative carrier is generated without switching between carriers. Transmitters of different cells and/or different sectors primarily use different carrier frequencies but periodically transmit using a neighboring sector's carrier frequency. Mobile node receivers use a single RF chain with a controllable RF filter to receive and process a signal within a first selected carrier band including two components, a first signal component identified with the first currently selected band and a second signal component identified with a second alternative band. Separate quality indicator values are obtained from the first and second signal components, compared, and a determination is made as to whether the receiver's RF filter should be switched to the second band.

19 Claims, 14 Drawing Sheets

(51) Int. Cl.
*H04B 1/00* (2006.01)
*H04B 1/10* (2006.01)
*H04B 1/403* (2015.01)
*H04B 17/327* (2015.01)
*H04B 17/382* (2015.01)

(56) References Cited

U.S. PATENT DOCUMENTS

| | | | |
|---|---|---|---|
| 4,792,993 A * | 12/1988 | Ma | 455/266 |
| 5,267,261 A | 11/1993 | Blakeney, II et al. | |
| 5,369,800 A * | 11/1994 | Takagi et al. | 455/59 |
| 5,507,010 A | 4/1996 | Ahonen | |
| 5,551,064 A * | 8/1996 | Nobbe et al. | 455/62 |
| 5,630,213 A * | 5/1997 | Vannatta | 455/133 |
| 5,719,871 A * | 2/1998 | Helm et al. | 370/479 |
| 5,742,896 A | 4/1998 | Bose et al. | |
| 5,745,479 A * | 4/1998 | Burns et al. | 370/245 |
| 5,790,587 A * | 8/1998 | Smith et al. | 375/147 |
| 5,896,562 A | 4/1999 | Heinonen | |
| 5,915,212 A | 6/1999 | Przelomiec et al. | |
| 5,933,787 A | 8/1999 | Gilhousen et al. | |
| 6,018,647 A * | 1/2000 | Fitzgerald | 455/135 |
| 6,078,571 A * | 6/2000 | Hall | 370/331 |
| 6,141,536 A | 10/2000 | Cvetkovic et al. | |
| 6,216,012 B1 | 4/2001 | Jensen | |
| 6,272,313 B1 | 8/2001 | Arsenault et al. | |
| 6,292,508 B1 | 9/2001 | Hong et al. | |
| 6,304,748 B1 | 10/2001 | Li et al. | |
| 6,347,234 B1 | 2/2002 | Scherzer | |
| 6,546,252 B1 * | 4/2003 | Jetzek et al. | 455/437 |
| 6,760,880 B1 | 7/2004 | Ofek et al. | |
| 6,775,547 B2 * | 8/2004 | Zimmerman et al. | 455/450 |
| 6,836,726 B2 | 12/2004 | Sanchez Peiro | |
| 6,990,324 B2 * | 1/2006 | Laroia et al. | 455/226.1 |
| 7,039,436 B1 * | 5/2006 | Kakehi | 455/525 |
| 7,068,703 B2 * | 6/2006 | Maric | 375/136 |
| 7,099,638 B2 | 8/2006 | Lyons et al. | |
| 7,136,653 B2 | 11/2006 | Lemke | |
| 7,181,171 B2 * | 2/2007 | Forrester | 455/82 |
| 7,359,692 B2 * | 4/2008 | Saed et al. | 455/277.1 |
| 7,382,757 B2 | 6/2008 | LoGalbo et al. | |
| 7,444,127 B2 | 10/2008 | Laroia et al. | |
| 7,453,912 B2 | 11/2008 | Laroia et al. | |
| 2002/0037742 A1 * | 3/2002 | Enderlein et al. | 455/552 |
| 2002/0054651 A1 | 5/2002 | Posti | |
| 2002/0086675 A1 * | 7/2002 | Mansour | 455/442 |
| 2002/0094785 A1 | 7/2002 | Deats | |
| 2002/0159413 A1 | 10/2002 | Tsubouchi et al. | |
| 2003/0211850 A1 * | 11/2003 | Chen et al. | 455/442 |
| 2003/0220079 A1 | 11/2003 | Kikuma | |
| 2004/0017794 A1 | 1/2004 | Trachewsky | |
| 2004/0029532 A1 * | 2/2004 | Schwarz et al. | 455/63.1 |
| 2004/0203567 A1 | 10/2004 | Berger | |
| 2004/0229590 A1 * | 11/2004 | Kubo et al. | 455/307 |
| 2005/0003772 A1 * | 1/2005 | Nemoto | 455/130 |
| 2005/0085265 A1 | 4/2005 | Laroia et al. | |
| 2005/0124345 A1 | 6/2005 | Laroia et al. | |
| 2005/0146470 A1 * | 7/2005 | Li et al. | 343/702 |
| 2005/0237389 A1 * | 10/2005 | Pugel et al. | 348/164 |
| 2005/0286547 A1 * | 12/2005 | Baum et al. | 370/437 |
| 2006/0009176 A1 * | 1/2006 | Saunders et al. | 455/137 |
| 2006/0035612 A1 * | 2/2006 | Miyagi et al. | 455/226.1 |
| 2006/0068739 A1 * | 3/2006 | Maeda et al. | 455/295 |
| 2006/0084475 A1 * | 4/2006 | Ohkubo et al. | 455/562.1 |
| 2008/0287130 A1 * | 11/2008 | Laroia et al. | |

FOREIGN PATENT DOCUMENTS

| | | |
|---|---|---|
| EP | 0410663 A2 | 1/1991 |
| EP | 0566551 A2 | 10/1993 |
| EP | 1126632 A1 | 8/2001 |
| EP | 1437906 A1 | 7/2004 |
| JP | 11113049 | 4/1999 |
| JP | 11298398 | 10/1999 |
| JP | 2001094529 | 4/2001 |
| JP | 2001517907 | 10/2001 |
| JP | 2002223479 | 8/2002 |
| JP | 2002280993 | 9/2002 |
| JP | 2002300628 | 10/2002 |
| JP | 2003283458 | 10/2003 |
| JP | 2004015193 | 1/2004 |
| JP | 2004048147 A | 2/2004 |
| JP | 2007509537 | 4/2007 |
| JP | 2007513569 | 5/2007 |
| JP | 2007537625 | 12/2007 |
| SU | 588637 | 1/1978 |
| WO | WO9534138 A1 | 12/1995 |
| WO | WO9854849 A2 | 12/1998 |
| WO | WO9916261 A1 | 4/1999 |
| WO | WO9934630 A1 | 7/1999 |
| WO | WO-0038457 A1 | 6/2000 |
| WO | 0160106 | 8/2001 |
| WO | WO03037027 A1 | 5/2003 |
| WO | WO2004019529 | 3/2004 |

OTHER PUBLICATIONS

Translation of Office Action in Japanese application 2010-196670 corresponding to U.S. Appl. No. 10/872,674, citing JP2001517907 and JP2004048147 dated Feb. 8, 2011.

European Search Report—EP04795398—Search Authority—Munich—May 26, 2011.

European Search Report—EP10009290—Search Authority—Munich—Apr. 3, 2012.

Supplementary European Search Report—EP04795314—Search Authority—Munich—Mar. 11, 2011.

* cited by examiner

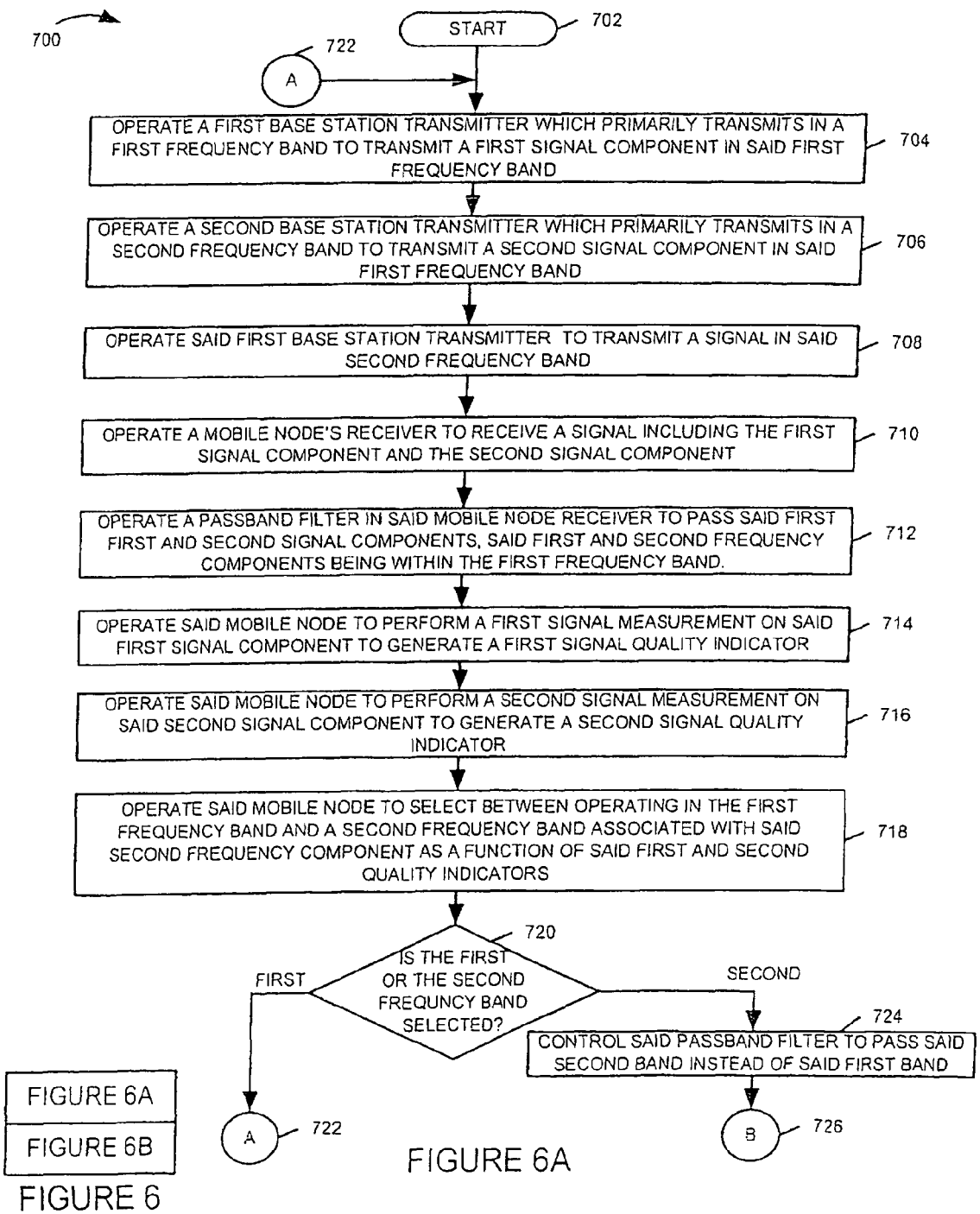

METHODS AND APPARATUS FOR SELECTING BETWEEN MULTIPLE CARRIERS USING A SINGLE RECEIVER CHAIN TUNED TO A SINGLE CARRIER

RELATED APPLICATIONS

The present application is a continuation of U.S. patent application Ser. No. 10/872,674 filed on Jun. 21, 2004 now U.S. Pat. No. 6,990,324 titled "METHODS AND APPARATUS FOR SELECTING BETWEEN MULTIPLE CARRIERS USING A SINGLE RECEIVER CHAIN TUNED TO A SINGLE CARRIER" which claims the benefit of U.S. Provisional Patent Application Ser. No. 60/562,900, filed Apr. 15, 2004 which is hereby expressly incorporated by reference.

FIELD OF THE INVENTION

The present invention relates to communications systems and, more particularly, to methods and apparatus for selecting between multiple carriers in wireless communications systems using a single receiver chain tuned to a single carrier.

BACKGROUND

From an implementation perspective, it may be beneficial to use different carriers in different portions of a communications system, e.g., because rights to different frequencies are owned in different geographic locations and/or because it is desirable to minimize signal interference through the use of different carriers. Spread spectrum wireless communications systems may use different carriers throughout a system, with each carrier being associated a different frequency band. In some wireless communications systems, different cells and/or sectors use different carriers. In some systems, the same sector or same cell uses different carriers each with an associated frequency band, e.g., where the total available bandwidth in a cell or sector is partitioned into different frequency bands, e.g., distinct frequency bands.

Wireless terminals (WTs), e.g., mobile nodes, may travel throughout the communications system and establish a connection with a given sector/cell base station using a particular carrier frequency and associated band, e.g., for downlink signaling. As conditions vary, e.g., due to a change in loading conditions, e.g., more users, on the carrier frequency, due to changes in levels of interference, or due to the WT moving, e.g., approaching a cell/sector boundary, it may be advantageous or necessary for the WT to transfer to a different carrier and attach to a different cell/sector/carrier frequency combination corresponding to a base station transmitter. Typically, in known systems, many wireless terminal receiver implementations use a single receiver chain and the wireless terminal remains on the same carrier until forced to switch, e.g., by a disruption in communications with the base station. This approach is undesirable since the WT experiences breaks in communications at boundaries and experiences changes in reception quality, e.g., fading, as the WT moves throughout the system. Other known receiver implementations use a single receiver chain, where the receiver interrupts communications with the connected base station transmitter and switches from the carrier in use, temporarily, to search and evaluate alternative potential carriers. This approach is undesirable since the WT disrupts normal communication sessions during the search intervals, expends time retuning the filter, e.g., RF filter, to adjust for each search frequency, expends time to wait for a detected carrier, collect and evaluate any received signals, e.g., pilot signals, and then expends time to re-tune to the original carrier setting.

In light of the above discussion, it is apparent that there is a need for improved methods and apparatus directed to efficient wireless terminal receiver design and operation. It would be beneficial if such apparatus and methods allowed for estimating the quality of two alternative channels using different carrier frequency bands at the same time without disrupting a communications session in progress. It would also be advantageous if such methods provided for continuous tracking of alternative carriers, allowing for wireless terminal selection of the carrier frequency/cell/sector base station attachment point, allowing for switching before disruptions in communications, allowing for the switching to occur at a convenient point, and allowing for switching in response to other considerations, e.g., system load conditions.

SUMMARY

Various embodiments of the invention are directed to wireless communications systems, e.g., spread spectrum OFDM and/or CDMA systems, using multiple carriers in the system, e.g., where the total available bandwidth is divided into different frequency bands, each band with an associated carrier frequency. Different cells in the system may use different carrier frequencies; different sectors of the same cell may use different carrier frequencies. In some embodiments, the same sector of a cell may use different carrier frequencies, e.g., at different power levels, providing additional diversity and additional base station connection alternatives, e.g., alternative attachment points for downlink traffic channel signaling.

Wireless terminal receivers accommodating carrier frequency selection methods in accordance with the present invention in multi-cell multi-sector wireless communications systems employing multiple carrier frequencies are described. In accordance with the invention, a WT receiver may include a single receiver chain, e.g., with a single RF module, yet be able to process information on multiple alternative carriers that may be alternatively selected, e.g., as the carrier frequency and its associated band to be used by the WT for receiving downlink traffic signaling in conjunction with a specific base station transmitter. Although the wireless terminal's receiver is tuned to a single band at a particular time, an estimate of the channel quality corresponding to the currently used carrier and an alternative carrier is generated without switching between carriers, in accordance with the present invention. This approach of the present invention is in contrast to known search and evaluation techniques using a single receiver chain where the WT suspends normal downlink traffic channel signal processing on the currently selected carrier frequency, switches to a potential alternative carrier, monitors for signals, performs measurements in be used in evaluations, and then switches back to the original carrier. The approach of the present invention, can reduce the disruptions during in progress communications sessions, can facilitate continuous WT tracking of alternative carriers, can inform the WT of the need for a handoff before a break in communication or a degradation to an unacceptable level, can facilitate efficient hand-offs with minimal disruption at opportune times between different base station connection points as a wireless terminal moves throughout the system, and/or can be used to help balance the system loading on different carriers.

In some embodiments, base station transmitters of different cells and/or different sectors, e.g., different adjacent cells and/or different adjacent sectors, primarily use different carrier frequencies but periodically transmit using a neighboring sector's carrier frequency. Mobile node receivers, in accordance with the invention, use a single chain with a controllable filter, e.g., a controllable RF filter, to receive and process a signal, e.g., composite signal from a plurality of different transmitters, within a first selected carrier band, the signal including two components, a first signal component identified with the first currently selected band and a second signal component identified with a second alternative band. Separate quality indicator values are obtained from the first and second signal components, compared, and a determination is made as to whether the receiver's controllable filter should be switched to the second band.

Wireless terminals, e.g., mobile portable communications devices, implemented in accordance with various embodiments of the present invention, include: a receiver antenna, a controllable filter coupled to said antenna, a first signal measurement device coupled to said controllable filter, a second signal measurement device coupled to said controllable filter, and a frequency band selection module. Each WT's receiver antenna is used for receiving a signal, e.g., a composite signal, including a first component and a second component. In some embodiments the signal, e.g., composite signal, is received over a period of time and the first and second signal components are received at different points in time. The controllable filter, e.g., an RF bandpass filter within a controllable RF module including a mixer, passes signals in a selected one of a first frequency band and a second frequency band while rejecting at least some of the frequencies in the other one of said first and second frequency bands. The first and second signal components being within the selected one of the first and second frequency bands. The first signal component is associated with the first frequency band, while the second frequency component is associated with the second frequency band. In some embodiments, wherein the controllable filter is a passband filter and wherein the first and second frequency components are narrow in frequency width compared to the width of the controllable filter, the first and second signal components have a width less than one half the passband width of the controllable filter. In some embodiments, e.g., some OFDM embodiments wherein the first and second signal components are received high power signals, e.g., beacon signals which are easy to detect, the first and second signal components have a frequency width at most 1/20 the frequency width of passband of the controllable filter.

The first signal measurement device performs a first signal measurement on the first signal component to generate a first signal quality indicator, while the second signal measurement device performs a second signal measurement on the second signal component to generate a second signal quality indicator. In some embodiments, the first signal measurement device can measure signal energy, SNR, and determine an error rate for WT specific signals, e.g., downlink traffic signals intended for the specific WT, as well as broadcast signals, e.g., assignment signals, pilot signals, and/or beacon signals; while the second signal measurement device performs energy detection and/or SNR detection on received broadcast signals, e.g., assignment signals, pilot signals, and/or beacon signals intended to be received by multiple devices. The frequency band selection module selects between operating in the first frequency band and the second frequency band as a function of the first and second quality indicator values and generates a control signal use to control, e.g., select, the one of the first and second frequency bands which will be passed by the controllable filter.

A base station located within a communication cell, in accordance with various embodiments of the present invention, includes a first transmitter, for transmitting said first signal components, which primarily transmits in the first frequency band. The base stations may facilitate sectorized operations and may include a first transmit antenna, coupled to the first transmitter, and directed towards a first sector of a cell for transmitting the first signal component. In addition, such a sectorized base station normally includes a second transmitter coupled to a second transmit antenna. The second transmitter primarily transmits in the second frequency band, but during a fraction of the time the second transmitter operates, it transmits the second signal component in the first frequency band in accordance with the invention. The second transmitter corresponds to a different sector of the cell than a sector to which the first transmitter corresponds. The second transmit antenna is directed the second sector of the cell for transmitting the second signal component. The first and second sectors are located in different physical areas of the cell, e.g., adjacent areas which may have some overlap.

In accordance with some embodiments of the invention, an additional base station, e.g., a second base station, is located in a corresponding second cell, e.g., adjacent to and/or partially overlapping with the cell corresponding to the first transmitter. Such an additional base station may include a transmitter and transmit antenna used for transmitting signals primarily into its own primary frequency band and, occasionally, e.g., periodically, into the frequency band used as the primary band of the adjacent cell's transmitter, e.g., the first transmitter's primary band. Such occasional signals may be received by the WT and evaluated as the second signal component of a received signal.

In some embodiments, the first and second frequency bands are at least 1 MHz in width. For example, the first and second frequency bands may be 1.25 MHz frequency bands as part of a 5 MHZ overall system using 3 or 4 different 1.25 MHz bands throughout the system. In various systems, using frequency bands of at least 1 MHz, the controllable filter of the receiver, has a passband less than 2 MHz in width.

In various embodiments, the controllable filter may be, e.g., an RF filter, a baseband filter or an I/F filter. The filter may be a digital filter which receives information corresponding to a frequency range larger than the selected frequency band and discards, e.g., does not process, the information outside the selected frequency band.

In some embodiments a controllable filter used for band selection is implemented after an FFT. In such cases FFT results for frequencies outside the selected band may be calculated but will go unused as a result of the filtering. In such embodiments, a physical filter in an RF module may be fixed and not controllable and signals from one or more bands are passed by the physical-filter. In one such embodiment after an FFT, tones outside the selected band are discarded, e.g., by a digital signal processing module and/or another controllable module. In such embodiments the module discarding information and/or tones outside the selected band is a controllable filter, and operates in response to the band selection control signal. Various embodiments of the invention are directed to communication methods of receiver operation used to select between multiple frequency bands. The receiver may be, e.g., a receiver within a portable mobile wireless terminal communications device.

An exemplary method, in accordance with the invention comprises receiving a signal, e.g., a composite signal, including a first signal component and a second signal component, the first and second signal components being within the first frequency band, operating a passband filter to pass the first and second signal components, performing a first signal measurement on the first signal component to generate a first signal quality indicator value, performing a second signal measurement on the second signal component to generate a second quality indicator value, and selecting between operating in the first frequency band associated with the first signal component and the second frequency band associated with the second signal component as a function of the first and second quality indicator values. In various embodiments, the first frequency band is outside the second frequency band, e.g., the first and second frequency bands may be distinct non-overlapping 1.25 MHz frequency bands within a 5 MHz communications system.

In accordance with at least one exemplary method of the invention, a first transmitter, e.g., a first base station transmitter, which primarily transmits in the first frequency band is operated to transmit the first signal component. The first signal component may be, e.g., a downlink traffic signal, an assignment signal, a pilot signal, and/or a beacon signal. The method further comprises operating a second transmitter, e.g., a different base station transmitter, which primarily transmits in the second frequency band to transmit, e.g., periodically, the second signal component in the first frequency band. The second signal component may be, e.g., a broadcast signal such as, e.g., an assignment signal, pilot signal, a beacon signal, etc.

In some embodiments, the first transmitter and the second transmitter are located in different sectors of the same cell, and the first signal component is transmitted using a first antenna corresponding to a first sector the same cell, while the second signal component is transmitted using a second antenna corresponding to a second sector of the same cell. In some embodiments, the first transmitter and second transmitter are located in different cells and the first signal component is transmitted using a first antenna corresponding to a first cell while the second signal component is transmitted using a second antenna corresponding to a second cell.

In some embodiments, the signal, e.g., the composite signal from two transmitters, is received over a period of time, and the first and second signal components are received at different points in time.

The first and second signal components are, in some embodiments, narrow in frequency width compared to the width of the passband filter. For example, in some embodiments, the first and second frequency components have a frequency width at most 1/20 the frequency width of the passband filter.

In some embodiments, the first and second frequency bands are at least 1 MHz in width, and the passband filter may have a passband less than 2 MHz in width.

In addition to the receiver, e.g., the WT receiver, being operated to receive, pass, measure the first and second signal components and select between first and second frequency bands, the method, in some embodiments, further comprises controlling the passband filter to pass the second band instead of the first band when the second frequency band is selected. Having switched into the second frequency band, the method can further comprise operating the passband filter to pass third and fourth signals components, said third and fourth frequency components being within the second frequency band, performing a third signal measurement on the third signal component to generate a third signal quality indicator, performing a fourth signal measurement on said fourth signal component to generate a fourth quality indicator, and selecting between operating in the first frequency band and the second frequency band as a function of said quality indicator values. Then, if the first frequency band is selected, the passband filter can be controlled to pass the first frequency band instead of the second frequency band.

In some embodiments, the steps of receiving the first and second signal components, and measuring first and second signal components, may be repeated multiple times, and the selecting of the second frequency band may occur after the second quality indicator value exceeds the first quality indicator value for a predetermined interval, e.g., a predetermined duration or a fixed number of signal measurements. This is done to prevent switching of bands in response to a short term or transient change in conditions. Other criteria can be used for the selection between frequency bands such as, e.g., predetermined threshold values. For example, the selecting can include selecting the frequency band corresponding to the lower signal quality value when the first and second quality indicator values both exceed the predetermined threshold for a preselected interval. Thus, when both signals components indicate satisfactory conditions, the lower quality, e.g., lower power, band may be selected freeing the higher power band to be used by another mobile. The selecting can also include selecting the frequency corresponding to the higher signal quality value when one of the first and second signal quality values is below a predetermined threshold, thereby selecting the better band when signal quality is an issue. The selecting can also include selecting the second frequency band when said first signal quality value decreases over time and said second signal quality value increases over time and a difference in the first and second quality values changes sign indicating that the wireless terminal is heading toward the transmitter of the second signal component and away form the transmitter of the first signal component.

In some embodiments, the selecting step is a function of the quality of service (QoS) to be provided to a user, the selecting function changing in response to information indicating a change in the QoS to be provided to the user. This change may be implemented as a change in a threshold value used by the selection module to select a frequency band.

In some embodiments, the selecting step is a function of communication system loading, and the method further comprises receiving information indicative of communication system loading, and modifying the selecting function in response to an indication in a change in communication system loading. For example, in the case where a wireless terminal detects heavy use of a first frequency band, the selection may alter a weight used in the selection determination to create a stronger preference for the second frequency band. The received loading information is communicated from a base station to a device, e.g., a WT receiving the signal from the base station.

In various embodiments, multiple alternative carriers may be evaluated before a selection decision is performed and a change in carriers is initiated, e.g., before a resetting of the controllable filter occurs. For example, in an exemplary 3 sector/cell system 5 MHz using three 1.25 MHz carrier bands, the first signal components may include signals, e.g., beacon signals, downlink traffic signals, pilot signals, assignment signals, etc., from the currently connected base station sector transmitter being used for downlink traffic signaling to the WT, while the second signal component may alternate between received signals, e.g., different beacon signals, from adjacent sectors/cells transmitters assigned other carrier frequencies as their primary carrier. After a set of received second signals from alternative base station sector transmitter attachment points is evaluated and a set of second quality indicator values is obtained, then a comparison is performed with the first quality indicator value, and a decision regarding changing the selected band is performed.

DETAILED DESCRIPTION OF THE INVENTION

Figure 1:
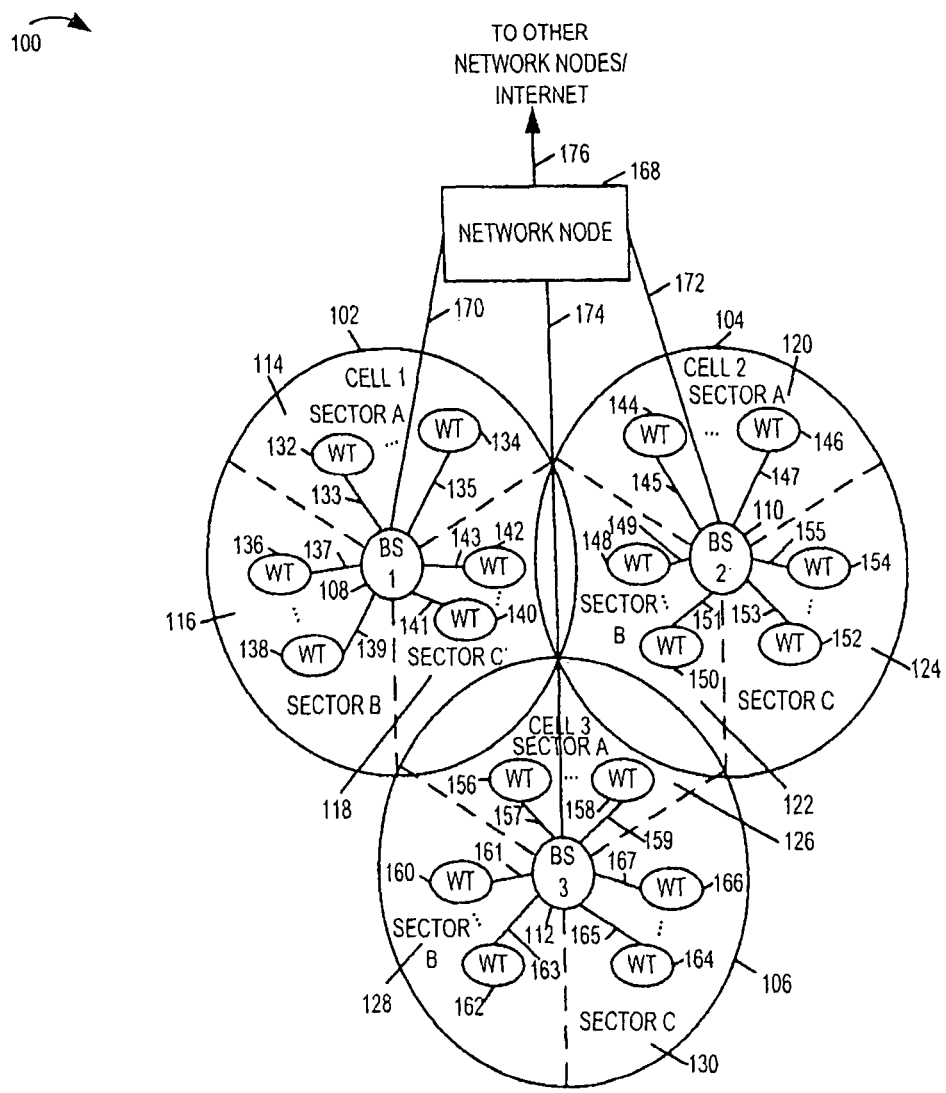
FIG. 1 is a drawing of an exemplary wireless communications system supporting multiple carriers implemented in accordance with the invention and using methods of the present invention.

FIG. 1 shows an exemplary wireless communications system 100, supporting multiple carriers and spread spectrum signaling, implemented in accordance with the present invention. The system 100 uses apparatus and methods of the present invention. FIG. 1 includes a plurality of exemplary multi-sector cells, cell 1 102, cell 2 104, cell 3 106. Each cell (102, 104, 106) represents a wireless coverage area for a base station (BS), (BS1 108, BS2 110, BS 3 112), respectively. In the exemplary embodiment, each cell 102, 104, 106 includes three sectors (A,B,C). Cell 1 102 includes sector A 114, sector B 116, and sector C 118. Cell 2 104 includes sector A 120, sector B 122, and sector C 124. Cell 3 106 includes sector A 126, sector B 128, and sector C 130. In other embodiments, different numbers of sectors per cell are possible, e.g., 1 sector per cell, 2 sectors per cell, or more than 3 sectors per cell. In addition, different cells may include different numbers of sectors.

Wireless terminals (WTs), e.g., mobile nodes (MNs), may move throughout the system and communicate with peer nodes, e.g., other MNs, via wireless links to BSs. In cell 1 102 sector A 114, WTs (132, 134) are coupled to BS 1 108 via wireless links (133, 135), respectively. In cell 1 102 sector B 116, WTs (136, 138) are coupled to BS 1 108 via wireless links (137, 139), respectively. In cell 1 102 sector C 118, WTs (140, 142) are coupled to BS 1 108 via wireless links (141, 143), respectively. In cell 2 104 sector A 120, WTs (144, 146) are coupled to BS 2 110 via wireless links (145, 147), respectively. In cell 2 104 sector B 122, WTs (148, 150) are coupled to BS 2 110 via wireless links (149, 151), respectively. In cell 2 104 sector C 124, WTs (152, 154) are coupled to BS 2 110 via wireless links (153, 155), respectively.

BSs may be coupled together via a network, thus providing connectivity for WTs within a given cell to peers located outside the given cell. In system 100, BSs (108, 110, 112) are coupled to network node 168 via network links (170, 172, 174), respectively. Network node 168, e.g., a router, is coupled to other network nodes, e.g., other base stations, routers, home agent nodes, AAA server nodes, etc., and the Internet via network link 176. Networks links 170, 172, 174, 176 may be, e.g., fiber optic links.

BSs 108, 110, 112 include sectorized transmitters, each sector transmitter using a specific assigned carrier frequency for ordinary signaling e.g., downlink traffic signals directed to specific WT(s), in accordance with the invention. The sector transmitter's assigned carrier frequency used for ordinary signaling also conveys broadcast signals such as, e.g., assignment signals, pilot signals, and/or beacon signals, from the BS to WTs. In addition, in accordance with the invention, each base station sector transmitter transmits additional downlink signals such as, e.g., pilot signals and/or beacon signals within the carrier frequency bands assigned to adjacent cell/sector transmitters for their ordinary signaling. Such downlink signals provide information to the WTs, e.g., WT 132, which may be used to evaluate and decide which carrier frequency to select and which corresponding base station sector/cell to use as an attachment point. The WTs, e.g., WT 132, include receivers with the capability to process information from BSs 108, 110, 112 sector transmitters providing information on alternative carrier frequencies bands that may be used for ordinary communications, e.g., downlink traffic channel signaling, and that may be selected by the WT.

Figure 2:
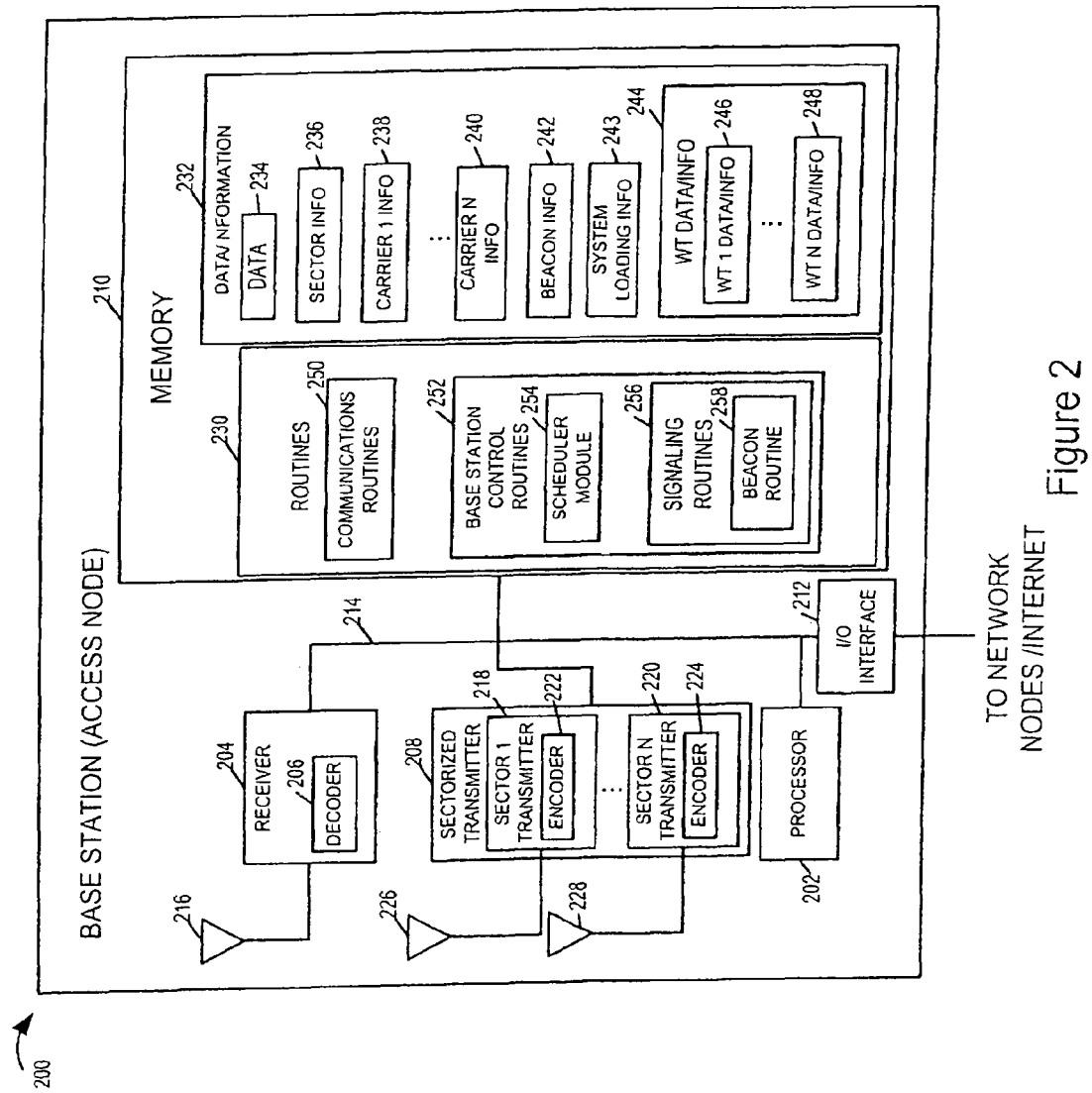
FIG. 2 is a drawing of an exemplary base station implemented in accordance with the present invention and using methods of the present invention.

FIG. 2 illustrates an exemplary base station 200, alternately referred to as an access node, implemented in accordance with the present invention. The BS is called an access node because it serves as a WT's point of network attachment and provides the WT access to the network. The base station 200 of FIG. 2 may be a more detailed representation of any of the base stations 108, 110, 112 of the system 100 of FIG. 1. The base station 200 includes a processor 202, e.g., CPU, a receiver 204 including a decoder 206, a sectorized transmitter 208, a memory 210, and an I/O interface 212 coupled together via a bus 214 over which the various elements can interchange data and information. The receiver 204 is coupled to a sectorized antenna 216 and can receive signals from wireless terminals 300 (see FIG. 3) in each of the sectors covered by the base station 200. The receiver's decoder 206 decodes received uplink signals and extracts the information encoded by the WTs 300 prior to transmission. The sectorized transmitter 208 includes a plurality of transmitters, a sector 1 transmitter 218, a sector N transmitter 220. Each sector transmitter (218, 220) includes an encoder (222, 224), for encoding downlink data/information, and is coupled to an antenna (226, 228), respectively. Each antenna 226, 228 corresponds to a different sector and is normally oriented to transmit into the sector to which the antenna corresponds and may be located. Antennas 226, 228 may be separate or may correspond to different elements of a single multi-sector antenna which has different antenna elements for different sectors. Each sector transmitter (218, 220) has an assigned carrier frequency band to be used for ordinary signaling, e.g., downlink traffic signaling. Each sector transmitter (218, 220) is capable of transmitting downlink signals, e.g., assignment signals, data and control signals, pilot signals, and/or beacon signals in its own assigned carrier frequency band. Each sector transmitter (218, 220), in accordance with the invention, also transmits additional downlink signals, e.g., pilot signals and/or beacon signals into other carrier frequency bands, e.g., the carrier frequency bands assigned to adjacent cells/sectors for their ordinary signaling. The base station I/O interface 212 couples the base station 200 to other network nodes, e.g., other access nodes, routers, AAA servers, home agent nodes, and the Internet. The memory 210 includes routines 230 and data/information 232. The processor 202 executes routines 230 and uses the data/information 232 in the memory 210 to control the operation of the base station 200 including scheduling users on different carrier frequencies using different power levels, power control, timing control, communication, signaling, and beacon signaling in accordance with the invention. The scheduling of a particular user, e.g., a particular WT 300, on a particular carrier frequency, may be in response to a selection performed by the WT 300, in accordance with the invention.

The data/information 232 in the memory 210 includes data 234, e.g., user data to be transmitted to and received from wireless terminals 300, sector information 236 including carrier frequencies associated with each sector and data transmission power levels associated with each carrier frequency within the sector, a plurality of carrier frequency information (carrier 1 info 238, carrier N info 240), beacon information 242, and system loading information 243. Carrier frequency information (238, 240) includes information defining the frequency of the carrier and the associated bandwidth. The beacon information 242 includes tone information, e.g., information associating beacon signals in each sector with specific frequencies and carriers, and sequence timing associated to transmit the beacon signals. The system loading information 243 includes composite loading information on each of various carrier bands supported by the base station 200. System loading information 243 may be transmitted from the base station 200 to the WTs 300 which may use the information, in some embodiments, in the decision process of the selection of carrier band to set within the WT receiver.

The data/information 232 in memory 210 also includes a plurality of WT data/information 244 sets, a set for each WT: WT 1 data/info 246, WT N data/info 248. WT 1 data/info 246 includes user data in route from/to WT 1, a terminal ID associating the WT to the base station 200, a sector ID identifying the sector in which WT 1 is currently located and carrier frequency information associating WT 1 to a specific carrier frequency used for ordinary signaling.

Base station routines 230 include communications routines 250, and base station control routines 252. The communications routines 250 implement the various communications protocols used by the base station 200. The base station control routines 252 include a scheduler module 254 and signaling routines 256. The base station control routines 252 control base station operation including the receiver 204, transmitters (218, 220), scheduling, signaling, and beacon signaling in accordance with the present invention. The scheduler module 254, e.g., a scheduler, is used for scheduling air link resources, e.g. bandwidth over time, to wireless terminals 300 for uplink and downlink communications. Base station control routines 252 also include signaling routines 256 which control: the receiver 204, the decoder 206, the transmitters (218, 220), the encoders (222, 224), ordinary signal generation, data and control tone hopping, and signal reception. The beacon routine 258, also included in the signaling routines 256, uses the beacon information 242 to control the generation and transmission of beacon signals in accordance with the invention. In accordance with the invention, in some embodiments, beacon signals, e.g., high power signals which are relatively narrow in terms of frequency, may be transmitted in each sector in each of the carrier frequency bands used by that sector/cell or by an adjacent sector/cell. These beacon signals are, in some embodiments, used by the WTs 300 to compare alternative available carriers.

Figure 3:
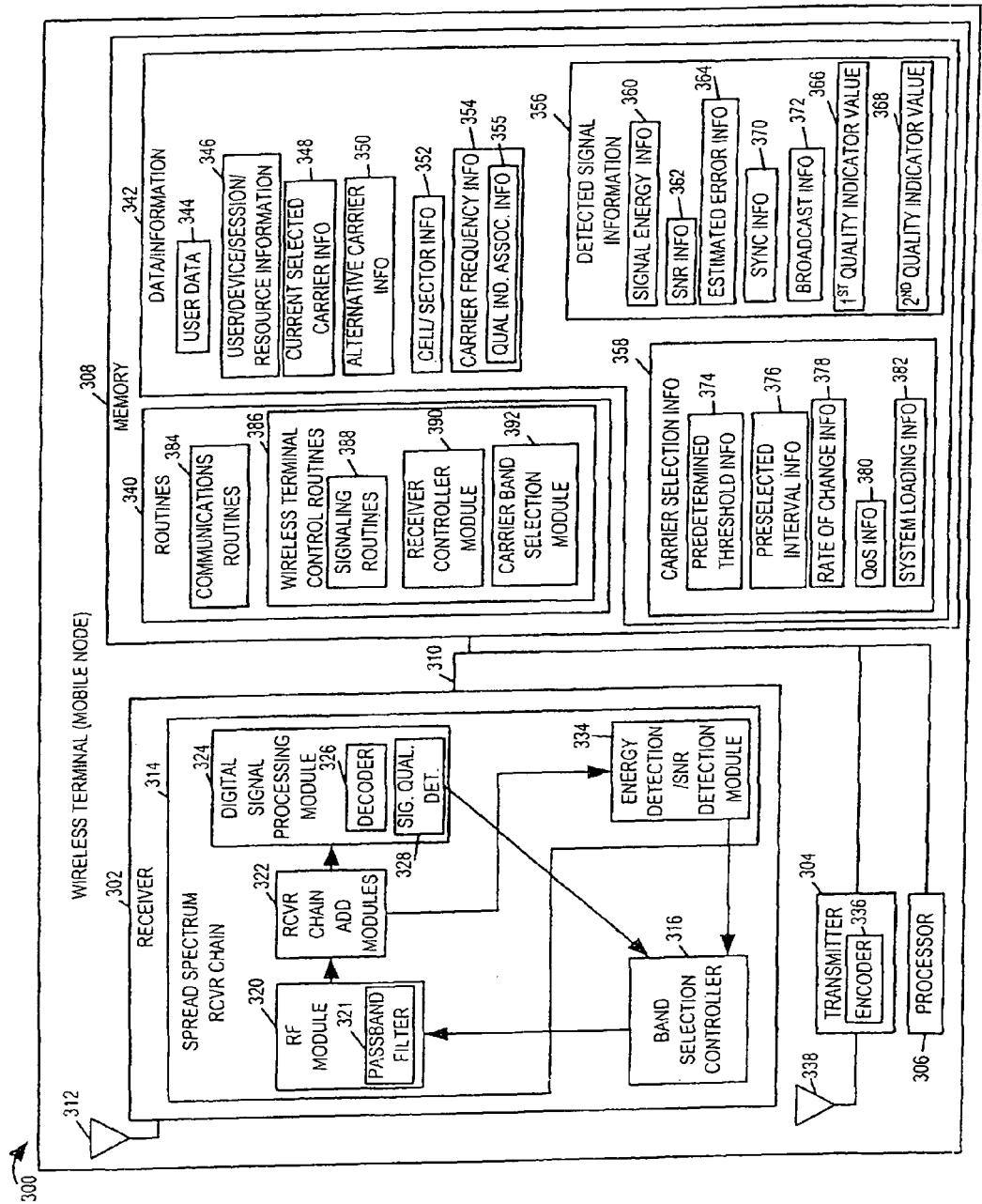
FIG. 3 is a drawing of an exemplary wireless terminal implemented in accordance with the present invention and using methods of the present invention.

FIG. 3 illustrates an exemplary wireless terminal 300, e.g., mobile node, implemented in accordance with the present invention and using methods of the present invention. The wireless terminal 300 of FIG. 3 may be a more detailed representation of any of the WTs 132, 134, 136, 138, 140, 142, 144, 146, 148, 150, 152, 154, 156, 158, 160, 162, 164, 166 of the system 100 of FIG. 1. The wireless terminal 300 includes a receiver 302, a transmitter 304, a processor 306, e.g., CPU, and memory 308 coupled together via a bus 310 over which the various elements can interchange data and information.

The receiver 302 is coupled to an antenna 312 through which downlinks signals are received from a plurality of base station sector transmitters and corresponding sector antennas 226, 228. The receiver 302 includes a single spread spectrum receiver chain 314, and a band selection controller 316. The spread spectrum receiver chain 314 includes a RF module (frequency synchronization circuit) 320 for performing filtering and other operations. The RF module 320 includes a controllable passband filter 321 for rejecting frequencies outside a selected band while passing frequencies, e.g., the carrier signal, falling within the selected band. Additional modules 322 are also included in the receiver chain 314 along with a digital signal processing module 324, and an energy detection/SNR detection module 334. Digital signal processing module 324 includes a decoder 326 and a signal quality detector module 328.

The RF module 320, receiver chain additional modules 322, digital signal processing module 324, and energy detection/SNR detection module 334 are used for receiving, decoding, measuring, and evaluating various signals, including, e.g., assignment signals, downlink traffic channel data and information signals, pilot signals, and/or beacon signals, being communicated by a plurality of cell/sector base station transmitters using a currently selected first band associated with a specific first carrier frequency. Band selection controller 316 outputs a signal to the RF module 320 and adjustable filter 321 included therein to select a specific carrier frequency; the RF module 320 passes received signal components within the selected carrier frequency band and rejects at least some of the signals outside the selected carrier frequency band. RF module 320 also performs additional processing, e.g., signals are mixed to baseband. Output signals passed by the RF module 320 are processed, e.g., filtered by a baseband filter, converted from analog to digital signals, and additionally filtered by a digital filter, by the receiver chain additional modules 322. Then, signals are output from the additional modules 322 and forwarded to the digital signal processing module 324 and the energy detection/SNR detection module 334. Some signal components, e.g., from a first base station cell/sector transmitter corresponding to the currently selected band are processed by the digital signal processing module 324; while other signal components, e.g., from a second cell/sector transmitter corresponding to a different carrier band are processed by the energy detection/SNR detection module 334. The digital signal processing module includes decoder 326 which can decode downlink traffic signals directed to a specific WT 300; while energy detection/SNR detection module 334 does not include such decoding capability.

Outputs, e.g., quality indicator values, from the signal quality detector module 328 of the digital signal processing module 324 and from the energy detection/SNR detection module 334 are input to the band selection module 316, which controls the selection of the frequency band setting in the RF module (frequency synchronization circuit) 320, in accordance with the invention.

Transmitter 304 includes an encoder 336 and is coupled to transmitter antenna 338. Data/information, e.g., blocks of uplink data/information may be encoded by encoder 336 and then transmitted through antenna 338 to base station 200.

The memory 308 includes routines 340 and data/information 342. The processor 306, e.g., a CPU, executes the routines 340 and uses the data/information 342 in memory 308 to operate the WT 300 and implement the methods of the present invention.

Wireless terminal data/information 342 includes user data 344, user device/session resource information 346, current selected carrier information 348, alternative carrier information 350, cell/sector information 352, carrier frequency information 354, detected signal information 356, and carrier selection information 358.

User data 344 includes data, information and files intended to be sent to/or received from a peer node in a communications session with the wireless terminal 300. User/device/session resource information 346 includes, e.g., terminal ID information, base station ID information, sector ID information, selected carrier frequency information, mode information, and identified beacon information. The terminal ID information may be an identifier, assigned to the WT 300 by the base station 200 to which the WT 300 is coupled, that identifies the wireless terminal 300 to the base station 200. Base station ID information may be, e.g., a value of slope associated with the base station 200 and used in hopping sequences. Sector ID information includes information identifying the sector ID of the sectorized base station's transmitter/receiver through which ordinary signaling is being communicated, and may correspond to the sector of the cell in which the wireless terminal 300 is located. Selected carrier frequency information includes information identifying the carrier, e.g., the carrier to which the RF module has been tuned, being used by the BS for downlink data signaling, e.g. traffic channel signals. Mode information identifies whether the wireless terminal is in an on/hold/sleep state.

Current selected carrier information 348 includes information identifying the selected carrier to which RF module 320 has been tuned by the band selection controller 316. Alternative carrier information 350 includes information identifying the alternative carrier to which the information being evaluated by the energy detection/SNR detection module 334 corresponds. Cell/sector ID information 352 may include information used to construct hopping sequences used in the processing, transmission, and reception of data, information, control signals, and beacon signals. Carrier frequency information 354 may include information associating each sector/cell of the base stations in the communications system with a specific carrier frequency or frequencies, frequency bands, beacon signals, and sets of tones. Carrier frequency information 354 also includes quality indicator association information 355 which associates each quality indicator value with a specific carrier frequency, which may be selected by the band selection controller 316.

Detected signal information 356 includes signal energy information 360, SNR information 362, estimated error information 364, a $1^{st}$ quality indicator value 366, and a $2^{nd}$ quality indicator value 368. Detected signal information 356 also includes synchronization information 370 and broadcast signal information 372.

The detected signal information 356 includes information which has been output from the signal quality detector 328 of the digital signal processing module 324 and from the energy detection/SNR detection module 334 in the receiver 302. Signal quality detector module 328 may measure and record signal energy 360, SNR 362, and/or estimated error rate 364 of a signal component from the first transmitter and determine a $1^{st}$ quality indicator value 366 indicative of the quality of the channel, e.g., downlink traffic channel, between the first transmitter and the WT 300 when using the carrier band to which the receiver 302 is currently set. Energy detection/SNR detection module 334 may measure and record signal energy 360 and/or SNR 362 of a component signal from the second transmitter to determine a $2^{nd}$ quality indicator value 368 indicative of a potential channel, e.g., downlink traffic channel between the second transmitter and WT 300 on a alternative carrier band.

Synchronization information 370 may include, in some CDMA embodiments, e.g., pilot signal based timing synchronization information used and/or obtained by the receiver, e.g., while processing a CDMA pilot signal. In some OFDM embodiments, the synchronization information may include symbol timing recovery information. Broadcast information 372 may include, e.g., broadcast related information used and/or obtained by the receiver while processing signals, e.g., pilot or beacon signals.

Carrier selection information 358 includes predetermined threshold information 374, pre-selected interval information 376, rate of change information 378, quality of service (QoS) information 380, and system loading information 382. The carrier selection information 358 is information, e.g., criteria, limits, etc., used by the WT 300 in making band selection decisions when evaluating the detected signal information, e.g., when comparing $1^{st}$ quality indicator value 366 to $2^{nd}$ quality indicator value 368. Predetermined threshold information 374 includes levels used to compare against quality indicator values 366, 368 for making band selection decisions. Pre-selected interval information 376 includes time intervals of a fixed duration and intervals of a fixed number of signal measurements, each which may be used to define a predetermined interval in which a consistent condition should exist, e.g., second quality indicator exceeds first quality indicator, before the band selection controller 316 changes the selection for the receiver RF module 320. Rate of change information 378 includes criteria used to identify when the first signal quality indicator value 366 decreases over time while the second signal quality indicator value 368 increases over time and a difference between the first and second quality indicator values changes sign. Quality of Service (QoS) information 380 includes information pertaining to the QoS provided to individual users, band selection as a function of the level of QoS to be provided to a user, and changes in selection as a result of changes in levels of QoS to be provided to the user. System loading information 382 includes received information pertaining to system loading communicated by a base station 200 which may be used in a function controlling decisions regarding band selection.

WT routines 340 include communications routines 384 and wireless terminal control routines 386. Wireless terminal communications routine 384 implements the various communication protocols used by the wireless terminal 300. Wireless terminal control routines 386 perform the functional control operations of the wireless terminal 300 including power control, timing control, signaling control, data processing, I/O, receiver control and carrier band selection functions in accordance with the invention. The WT control routines 386 include signaling routines 388, a receiver controller module 390 and a carrier band selection module 392. The signaling routines 388 using the data/information 342 in memory 308 control the signaling, e.g., uplink and downlink communicated signals, of the WT 300. The receiver controller module 390 in coordination with modules 324, 334 controls operation of the receiver 302 including the decoding, energy detection and/or SNR detection performed on received signals and the generation of $1^{st}$ and $2^{nd}$ quality indicator values 366, 368, in accordance with the present invention. The carrier band selection module 392 in coordination with the band selection controller 316 uses the data/information derived from the received signals including $1^{st}$ and second quality indicator values 366, 368 as well as carrier selection information 358 to make decisions as to which carrier to select for tuning the RF module 320 of the receiver 302, in accordance with the present invention.

Figure 4:
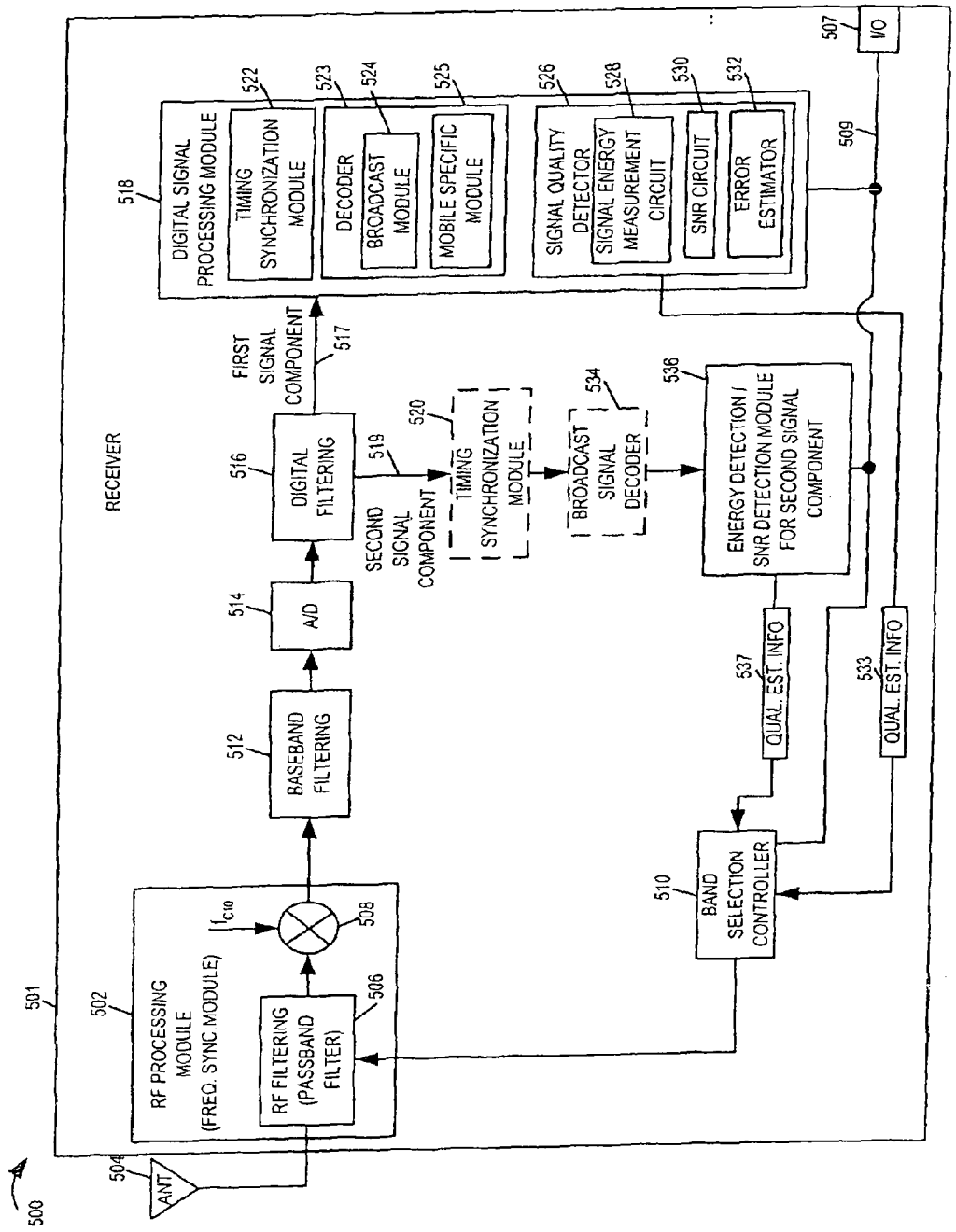
FIG. 4 is a drawing of an exemplary embodiment of a receiver that can process two components of a received signal from the same selected carrier band at the same time, each component conveying different information, e.g., information corresponding to one of two different carrier bands, the receiver implemented in accordance with the present invention and using methods of the present invention.

FIG. 4 is example of an exemplary wireless terminal receiver 501/antenna 502 combination 500 implemented in accordance with the present invention. The receiver/antenna combination 500 of FIG. 4 may be used as the receiver 302/antenna 312 combination in the WT 300 of FIG. 3. Receiver 501 illustrates an exemplary embodiment of a receiver, in accordance with the invention, that can process two components of a received signal included in the same selected carrier band at the same time, each component conveying different information, e.g., information corresponding to one of two different carrier bands transmitted by different transmitters and/or different transmit antennas. The two signal components may correspond to different sectors of a cell and/or different cells.

The receiver 501 of FIG. 4 uses a single RF processing chain which includes a single RF processing module (frequency synchronization module) 502. The receiver 501 is coupled to an antenna 504 which receives downlink signals from a plurality of sector/cell base station transmitters. The antenna 504 is coupled to the RF processing module 502. The RF processing module 502 includes a selectable RF filter 506 and a mixer circuit 508. The RF filter 506 may be implemented as a passband filter and serves as a frequency synchronization circuit. The RF processing module 502 has been tuned to a carrier frequency selected by a band selection controller 510. The RF filter passes received signal components within the selected carrier band and rejects at least some signal components outside the selected carrier band.

The received passband signal from the antenna 504 is input to the RF filter 506 and processed by a mixer circuit 508 resulting in a baseband signal. The resulting baseband signal is output from the RF processing module 502 and input to a baseband filter 512. The filtered output from the baseband filter 512 is input to an A/D convertor module 514, where analog to digital conversion is performed. The resulting output digital signal is input to a digital filter 516 for additional filtering. Then an output of the digital filter 516, a first signal component 517, e.g., originally sourced from a first base station cell/sector transmitter, is input to a digital signal processing module 518, while another output of the digital filter 516, a second signal component 519, e.g., originally sourced from a second cell/sector base station transmitter is output to an energy detection/SNR detection module 536. The digital signal processing module 518 includes a timing synchronization module 522, a decoder 523, and a signal quality detector 526. Thus digital signal processing module 518 is capable of fully decoding broadcast as well as WT specific information, e.g., information intended for the individual WT and not other WTs.

The timing synchronization module 522 is used for timing synchronization of received data being processed, e.g., received downlink signals. CDMA as well as OFDM embodiments are contemplated. The timing synchronization module 522 in CDMA embodiments may be implemented using known de-spreading techniques. The timing synchronization module 522 in OFDM embodiments may implemented as a symbol timing recovery circuit using known techniques. The decoder 523 includes a broadcast module 524 for decoding received broadcast signals, e.g., beacon signals, pilot signals, etc., and a mobile specific module 525 for decoding received downlink data/information, e.g., downlink traffic signals, intended for the specific WT 300 to which receiver 501 belongs.

The signal quality detector 526 includes a signal energy measurement circuit 528, a SNR circuit 530, and/or an error estimator 532. The signal quality detector 526 obtains a quality estimate for the channel, from first base station cell/sector transmitter to WT 300, being used for downlink traffic channel signaling. The quality estimate is based on the signal energy measurement circuit 528 output, the SNR circuit 530 output which is a function of measured signal energy, and/or a measured or estimated error rate of received data/information determined by error estimator 532. Signal quality estimate information 533, e.g., a quality indicator value corresponding to the currently selected carrier band, is forwarded to the band selection controller 510 to be used in making a band selection decision.

In the FIG. 4 implementation, second signal component processing is shown as being performed by a separate set of receiver components, e.g., optional timing synchronization module, optional broadcast decoder 534, and energy detection/SNR detection module 536. However, it should be appreciated that the elements of the digital signal processing module 518 can be used on a time shared basis where the first and second signal components are of the same type, e.g., OFDM signals. In cases where the second signal component is a beacon signal or other signal where timing synchronization and/or decoding are not required to generate a quality indicator value, timing synchronization module 520 and broadcast signal decoder 534 may be omitted. However, in cases where the first signal component corresponds to a signal of a first type, e.g., an OFDM signal, and the second signal component corresponds to a signal of a second type, e.g., a CDMA signal, separate signals and/or modules for generating signal quality values for the first and second signal components may be more cost effective than using circuitry, e.g., re-configurable circuitry which can be configured to handle signals of different types.

In some embodiments, e.g., CDMA embodiments, the second signal component 519 is processed through a timing synchronization module 520. The timing synchronization module 520 in CDMA embodiments may be implemented using known de-spreading techniques. In some embodiments, e.g., various CDMA embodiments, the second signal component 519 is also processed through a broadcast signal decoder 534.

The second signal component, which may have been subjected to the optional processing described above, is input to the energy detection and/or SNR detection module 536. The processed received signal component being evaluated by the energy detection and/or SNR detection module 536 may be, e.g., in some OFDM embodiments, a detected beacon signal transmitted from a second transmitter, e.g., an adjacent cell/sector base station transmitter with respect to the first cell/sector base station transmitter which transmits the first signal component. The processed received signal component being evaluated by the energy detection and/or SNR detection module 536 may be, e.g., in some CDMA embodiments, a detected pilot signal transmitted from a second transmitter, e.g., an adjacent cell/sector base station transmitter with respect to the first cell/sector base station transmitter which transmits the first signal component. The energy detection and/or SNR detection module 536 generates information which can be used as a quality estimate for a potential downlink channel between the second cell/sector base station transmitter and WT 300 corresponding to the second signal component being evaluated, the signal quality estimate information 537. The generated quality estimate is based on the signal energy measurement or an SNR measurement which is a function of detected signal energy. Signal quality estimate information 537 is forwarded to the band selection controller 510 for use in making band selection decisions, e.g., for selecting between first and second frequency bands corresponding to the first and second components respectively.

In several embodiments, the energy detection and/or SNR detection module 536 is simpler in computational complexity, e.g., either in number of gates or in executable instructions, than the digital signal processing module 518. This is possible because, in many cases, to generate the quality estimate information corresponding to the second signal component it is not necessary to decode the received signal component, and, in cases where decoding is used, it can be limited to decoding of broadcast data which is usually easier to decode than mobile specific data due to the type of coding used compared to the case of mobile specific data and/or the power transmission level of the broadcast data which is often higher than the power transmission level of mobile specific data since the broadcast signal is intended to reach multiple mobile devices.

The signal component quality information (533, 537) forwarded from the digital signal processing module 518 and the energy detection and/or SNR detection module 536, respectively, is used by the band selection controller 510 to make decisions concerning the settings of the carrier frequency band to be used by RF processing module 502, e.g., which band and thus, base station sector transmitter, should be selected for receiving downlink communications.

In some embodiments, the receiver 501 in FIG. 4 is a spread spectrum receiver which processes a spread spectrum signal, e.g. CDMA and/or OFDM. In some OFDM embodiments, the optional timing synchronization module 520 corresponding to the second component is not used. In some OFDM embodiments, the broadcast signal decoder 534 may be used, while in other OFDM embodiments, the broadcast signal decoder 534 is not needed and is omitted. In embodiments where the second signal component is a CDMA signal, the timing synchronization module 520 is used, while the broadcast signal decoder 534 may or may not be used.

Receiver 501 of FIG. 4 includes an I/O interface 507 coupled to digital signal processing module 518, the energy detection/SNR detection module 536, and the band selection controller 510 via bus 509 over which the various elements may interchange data and information. In other embodiments, bus 509 may be coupled to other receiver components, e.g., broadcast signal decoder 534, and/or timing synchronization decoder 534. The receiver 501 may communicate with other elements of the WT 300 via I/O interface 507 which couples receiver 501 to bus 312. Decoded downlink traffic channel signals may be conveyed via interface 507, e.g., to one or more external devices such as a display and/or other WT components.

Figure 5:
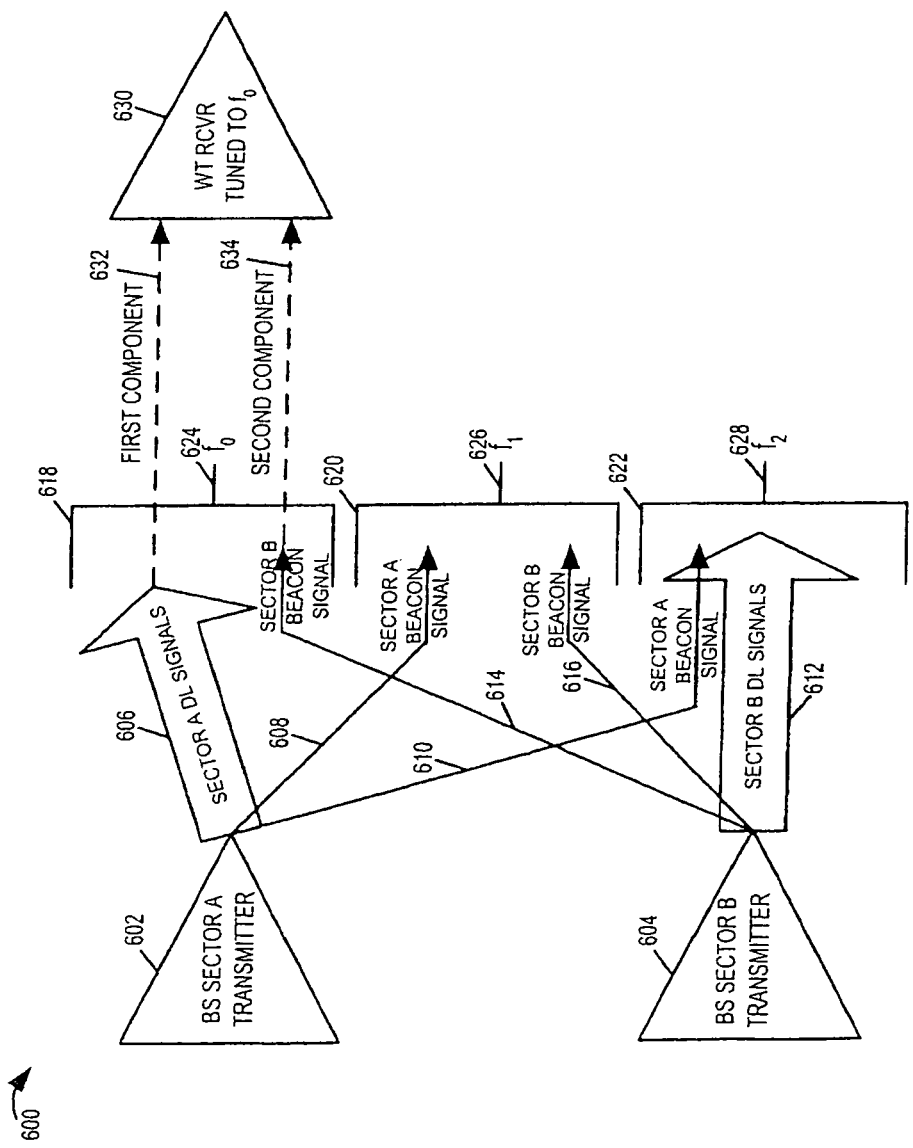
FIG. 5 is a drawing illustrating exemplary base station signaling associated with an exemplary wireless terminal embodiment utilizing an exemplary embodiment of the single receiver chain receiver of FIG. 4 in accordance with the invention.

FIG. 5 is an illustration 600 used to explain an exemplary embodiment of the invention using the single RF processing module receiver 500 of FIG. 4. Two transmitters 602, 604, e.g., from adjacent sectors A and B, respectively, of a cell, are transmitting downlink signals including, e.g., ordinary traffic channel signals, e.g., user data, optionally pilot signals, and beacon signals. The transmitters 602, 604 may use different antennas directed towards different sectors or cells. Signaling from each sector transmitter includes ordinary signaling, e.g., assignment signals, optionally pilot signals, and/or optionally beacon signals, in its own designated carrier frequency band and beacon signals in one or more, e.g., the other two, carrier frequency bands used in a cell. BS sector A transmitter 602 transmits downlink signals 606 including, e.g., sector A downlink traffic signals, sector A assignment signals, optionally sector A pilot signals, and/or optionally sector A beacon signals into a frequency band 618 with carrier frequency $f_0$ 624, sector A beacon signals 608 into a frequency band 620 with carrier frequency $f_1$ 626, and sector A beacon signals 610 into a frequency band 622 with carrier frequency $f_2$ 628. BS sector B transmitter 604 transmits downlink signals 612 including, e.g., sector B downlink traffic signals, sector B assignment signals, optionally sector B pilot signals, and/or optionally sector B beacon signals into frequency band 622 with carrier frequency $f_2$ 628. BS sector B transmitter 604 also transmits sector B beacon signals into frequency band 618 with carrier frequency $f_0$ 624, and sector B beacon signals 616 into frequency band 620 with carrier frequency $f_1$ 626.

Assume that a receiver 630, e.g., an exemplary embodiment of receiver 500 of FIG. 4, is tuned to carrier frequency band 618 with carrier frequency $f_0$ 624. The receiver 630 receives two signal components 632, 634, the first signal component 632, including e.g., ordinary signaling, assignment signals, pilot signals, and/or beacon signals from the sector A transmitter 602 is processed by the digital signal processing module 518, while the second signal component 634, e.g., the beacon signal from the sector B transmitter 604 is processed by the energy detection/SNR detection module 536. From first component 632 and using digital signal processing module 518, receiver 630 determines a quality estimate of the downlink traffic channel between BS sector A transmitter to receiver 630 using carrier frequency $f_0$ 624 and frequency band 618. From second component 634 and using energy detection/SNR detection module 536, receiver 630 determines a quality estimate of a potential alternate downlink traffic channel between BS sector B transmitter 604 and receiver 630 using carrier frequency $f_2$ 628 and frequency band 622.

In some embodiments of the invention, beacon signals may not be used, and other downlink signals may be received and processed for band selection decisions. For example, each sector an/or cell transmitter transmits some downlink signals, e.g., assignment signals, sector/cell base station identification signals, and/or pilot signals, in the frequency band used by that transmitter for ordinary downlink traffic channel signaling and also transmits some additional downlink signals, e.g., sector/cell base station identification signals, and/or pilot signals, into different frequency bands used by other, e.g., adjacent, sector/cell transmitters for their ordinary downlink traffic signaling. The transmission into different frequency bands may occur at periodic intervals and may correspond in duration to a small amount of time relative to the transmission of signals into the sector to which the transmitter corresponds.

A receiver, such as single RF chain receiver 500 of FIG. 4, in accordance with the invention, is tuned to one frequency band, but receives downlink signal components from multiple cell and/or sector transmitters which transmit into the frequency band. The receiver receives and processes a composite signal, the composite signal within the tuned frequency band, the composite signal including first and second components from two different transmitters. Information can be generated from the first and second signal components that can, and is, used to ascertain quality indication information concerning two alternative frequency bands, each frequency band corresponding to a different signal component.

In one particular exemplary OFDM (Orthogonal Frequency Division Multiplexed) embodiment, a beacon signal is implemented as a relatively high powered signal that is transmitted as a narrow signal in terms of frequency, e.g., using a single or a few tones. When a beacon signal is transmitted in the exemplary OFDM embodiment, most of the transmission power is concentrated on one or a small number of tones, which comprise the beacon signal. In some embodiments, the first signal component 632 includes a beacon signal component, corresponding to a first transmitter while the second signal component includes a beacon signal corresponding to a second, e.g., different transmitter which will normally correspond to a different sector and/or cell. In one such embodiment, the carrier selection is based upon evaluation of the beacon signals. In some embodiments, the beacon signals are narrow in frequency width compared to the band of the passband filter, e.g., at most $\frac{1}{20}$ the frequency width of the passband filter.

Figure 6B:
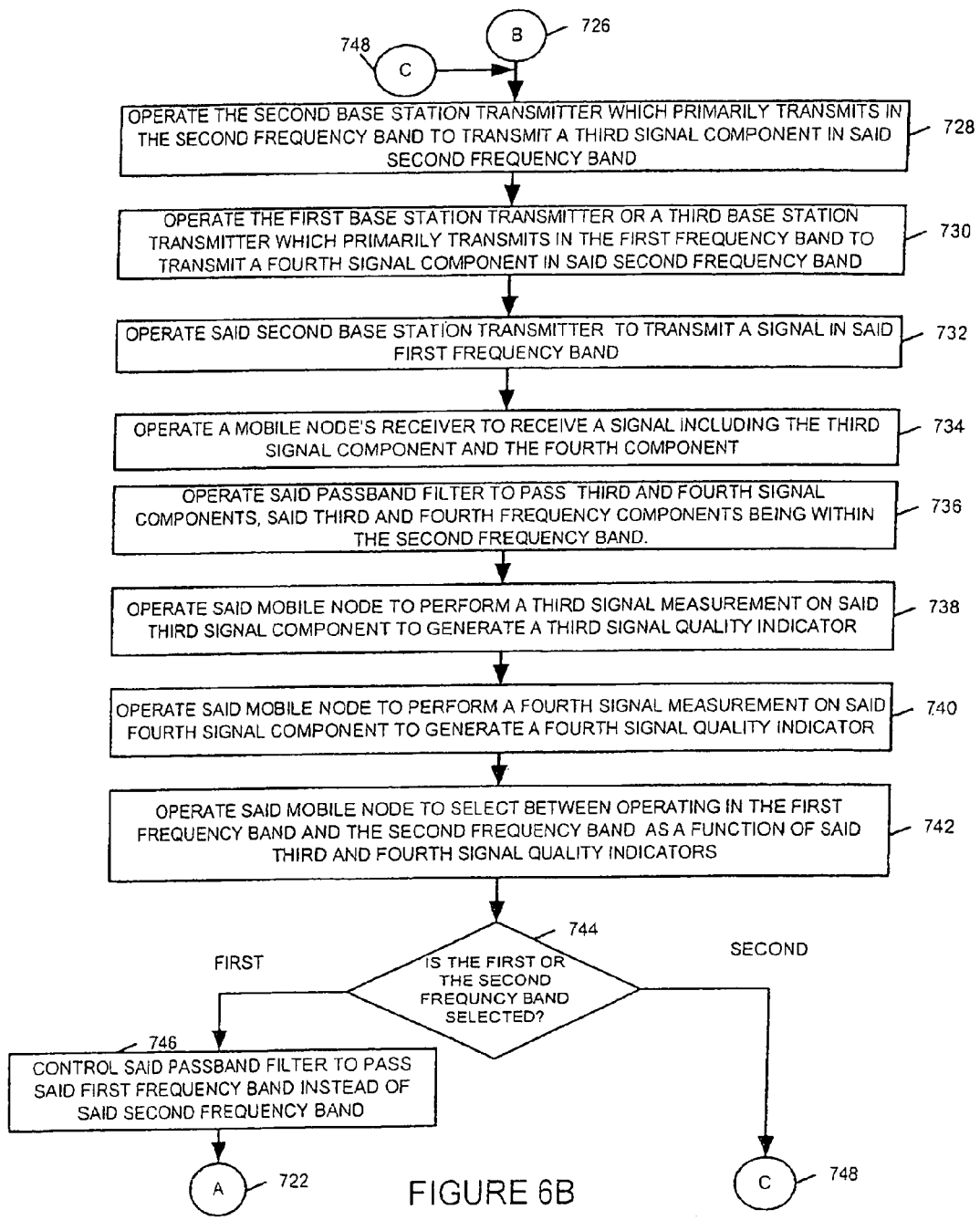
FIG. 6 is a flowchart illustrating an exemplary communications method of operating a communications system including an exemplary wireless terminal utilizing an exemplary single receiver chain receiver of FIG. 4 in accordance with the present invention.

In accordance with the present invention, the first and second signal components may be transmitted at the same time, e.g., on different frequencies within the currently selected band. Alternately, the first and second signal components can be transmitted and received sequentially. FIG. 6 is a flowchart 700 illustrating an exemplary method of operating a communications system in accordance with the present invention. FIG. 6 comprises the combination of FIGS. 6A and 6B. Operation starts in step 702, where the communications system is initialized, e.g., base stations are reinitialized and mobile nodes are powered on. Operation proceeds from step 702 to step 704.

In step 704, a first base station transmitter, which primarily transmits in a first frequency band, is operated to transmit a first signal component in said first frequency band. Operation proceeds from step 704 to step 706. In step 706, a second base station transmitter, which primarily transmits in a second frequency band, is operated to transmit, e.g., periodically, a second signal component in said first frequency band. In step 708, said first base station transmitter is operated to transmit, e.g., periodically, a signal in said second frequency band, which is different from the first frequency band. In some embodiments, the second frequency band is completely outside the first frequency band, while in other embodiments there may be a partial overlap in the first and second frequency bands. In some embodiments, the first transmitter and the second transmitter are located in different sectors of the same cell; the first signal component is transmitted using a first antenna or antenna element corresponding to a first sector of said same cell; and the second signal component is transmitted using a second antenna or antenna element corresponding to a second sector of said same cell. In some embodiments, the first transmitter and the second transmitter are located in different cells. In such an embodiment, the first signal component is transmitted using a first antenna or antenna element corresponding to a first cell, and the second signal component is transmitted using a second antenna or antenna element corresponding to a second cell. Operation proceeds from step 708 to step 710.

In step 710, a mobile node's receiver is operated to receive a signal including the first component and the second signal component. In some embodiments, the signal is received over a period of time and the first and second signal components are received at different points in time. In some embodiments, the first and second signal components are received at the same time, e.g., on different frequencies within the first frequency band.

Then in step 712, a passband filter in said mobile node's receiver is operated to pass said first and second signal components, said first and second frequency components being within a selected frequency band. The passband filter rejects signals outside the first frequency band. In some embodiments, e.g., an OFDM embodiment wherein the first and second frequency components are beacon signals, the first and second signal components are narrow in frequency width compared to the width of said passband filter, e.g., at most $\frac{1}{20}$ the frequency width of the passband filter. In some embodiments, wherein the first and second frequency bands are at least 1 MHz in width, the passband filter has a passband less than 2 MHz in width.

Operation proceeds from step 712 to step 714. In step 714, said mobile node is operated to perform a first signal measurement on said first signal component to generate a first signal quality indicator. In step 716, said mobile node is operated to perform a second signal measurement on said second signal component to generate a second signal quality indicator. Operation proceeds from step 716 to step 718. In step 718, the mobile node is operated to select between operating in the first frequency band and the second frequency band associated with said second frequency component as a function of said first and second quality indicators. Operation proceeds from step 718 to step 720.

In some embodiments, the receiving step 710, filtering step 712, and measurements steps 714, 716 are repeated multiple times, and the selecting between said first and second frequency bands of step 718 is performed after the second quality indicator exceeds said first quality indicator for a predetermined interval, e.g., a time interval of predetermined duration or a fixed number of signal measurements. This is done to prevent switching of bands in response to a short term or transient change in conditions.

In some embodiments, the selecting is based upon a predetermined threshold. For example, the selecting can include: selecting the frequency band corresponding to the lower signal quality value when the first and second signal quality values both exceed said predetermined threshold for a predetermined interval. Thus, when both signal components indicate satisfactory conditions, the lower quality, e.g., lower power, band may be selected freeing the higher power band to be used by another mobile.

Selection may involve selecting the frequency band corresponding to the higher signal quality value when one of said first and second signal quality values is below said predetermined threshold thereby selecting the better band when signal quality is an issue. Selection can also involve selecting the second frequency band when said first signal quality value decreases over time and said second signal quality value increases over time and a difference in the first and second quality values changes sign indicating that the wireless terminal is heading toward the transmitter of the second signal component and away form the first component transmitter.

In some embodiments, the selecting step is a function of a quality of service (QoS) to be provided to the mobile node, e.g., user, said selecting function changing in response to information indicating a change in the QoS to be provided to said user. This change may be implemented as a change in a threshold quality used by said selection module to select a frequency band.

In some embodiments, the selecting step is a function of communication system loading and the method further comprises the mobile node receiving, e.g., from a base station, information indicative of communications system loading and modifying said selecting function in response to an indication in a change in communication system loading. For example, in the case where a wireless terminal detects heavy use of a first frequency band, the selection may alter a weight used in the selection determination to create a stronger preference for the second frequency band.

In step 720, operation is directed based upon whether the first frequency band is selected or the second frequency band is selected. If the first frequency band is selected, then operation proceeds via connecting node A 722 to step 704; however, if the second frequency band is selected, then operation proceeds to step 724.

In step 724, the passband filter is controlled to pass said second band instead of said first band. Operation proceeds from step 724 via connecting node B 726 to step 728.

In step 728, the second base station transmitter, which primarily transmits in the second frequency band is operated to transmit a third signal component in said second frequency band. In step 730, the first base station transmitter or a third base station transmitter, which primarily transmits in the first frequency band is operated to transmit a fourth signal component in said second frequency band. In step 732, the second base station is operated to transmit a signal in said first frequency band. In step 734, the mobile node's receiver is operated to receive a signal including the third signal component and the fourth signal component. Operation proceeds form step 734 to step 736. In step 736, said passband filter in the mobile node is operated to pass the third and fourth signal components being within the second frequency band. In step 738, the mobile node is operated to perform a third signal measurement on said third signal component to generate a third signal quality indicator. In step 740, the mobile node is operated to perform a fourth signal measurement on said fourth signal component to generate a fourth signal quality indicator. Operation proceeds from step 740 to step 742.

In step 742, the mobile node is operated to select between operating in the first frequency band and operating in the second frequency band as a function of said third and fourth signal quality indicators. Operation proceeds from step 742 to step 744.

In step 744, operation proceeds based upon whether the first or the second frequency band is selected. If the second frequency band is selected, operation proceeds from step 744 via connecting node C 748 to step 728. However, if the first frequency band is selected, then operation proceeds from step 744 to step 746, where the passband filter in the mobile node is controlled to pass said first frequency band instead of said second frequency band. Operation proceeds from step 746 via connecting node A 722 to step 704.

FIGS. 7-12 are used to illustrate exemplary signals and band selection by an exemplary wireless terminal receiver in accordance with the present invention.

Figure 7:
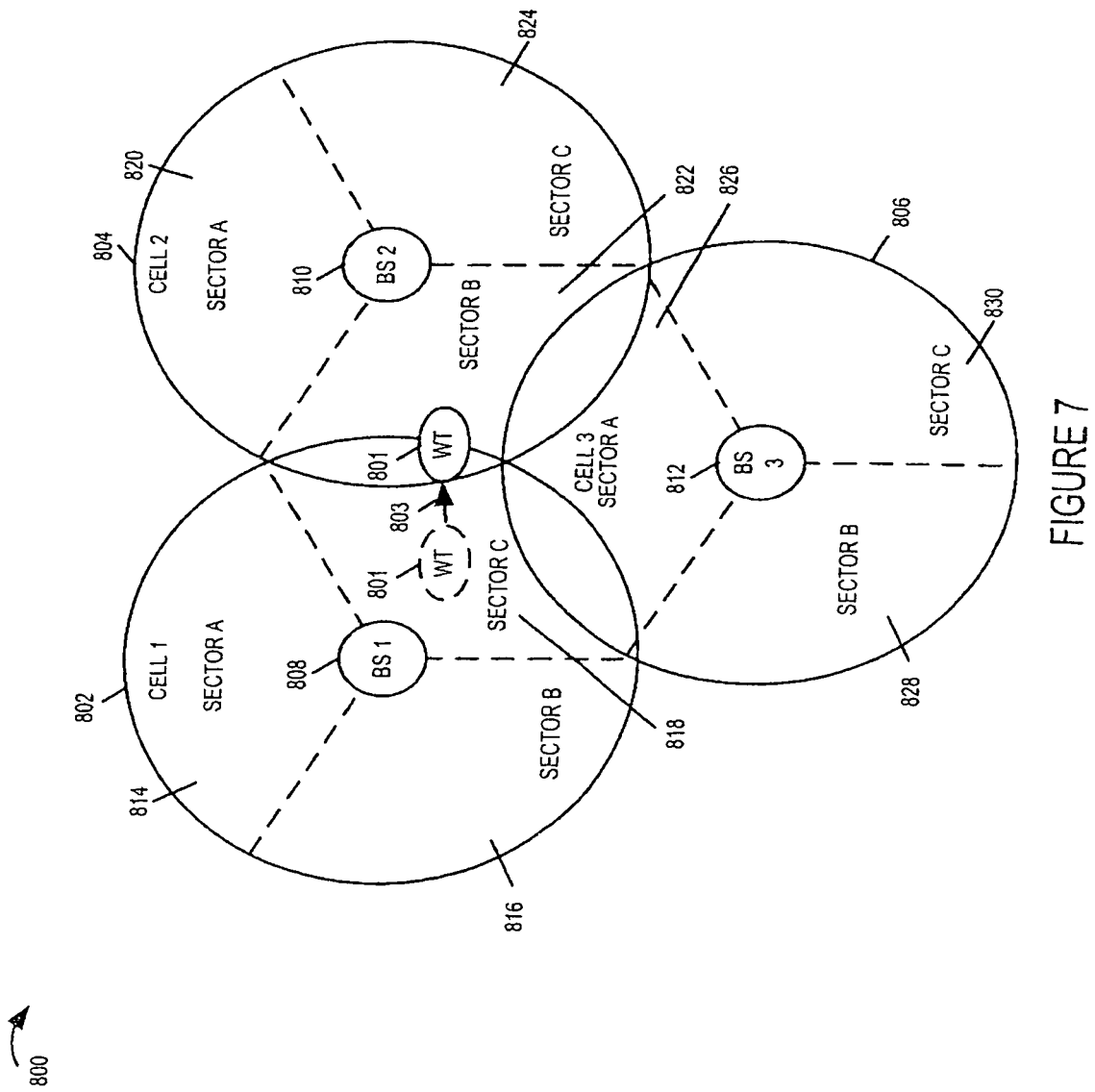
FIG. 7 is a drawing of a portion of an exemplary wireless communications systems implemented in accordance with the invention, the system including an exemplary wireless terminal in motion and is used for purposes of further explaining the invention.

FIG. 7 shows a portion of an exemplary wireless communications system 800, supporting multiple carriers and spread spectrum OFDM signaling, implemented in accordance with the present invention. System 800 may be an exemplary embodiment of system 100 of FIG. 1. FIG. 7 includes a plurality of exemplary multi-sector cells, cell 1 802, cell 2 804, cell 3 806. Each cell (802, 804, 806) represents a wireless coverage area for a base station (BS), (BS1 808, BS2 810, BS 3 812), respectively. BSs 808, 810, 812, may be exemplary embodiments of BS 200 of FIG. 2. The BSs 808, 810, 812, are coupled together via a network and coupled to other network nodes and the Internet. In the exemplary embodiment, each cell 802, 804, 806 includes three sectors (A,B,C). Cell 1 802 includes sector A 814, sector B 816, and sector C 818. Cell 2 804 includes sector A 820, sector B 822, and sector C 824. Cell 3 806 includes sector A 826, sector B 828, and sector C 830. FIG. 7 also includes an exemplary WT 801, implemented in accordance with the present invention. WT 801 may be an exemplary embodiment of WT 300 of FIG. 3. Exemplary WT 801's current point of attachment is the sector 3 818 transmitter of BS 1 808. The WT 801 is moving toward BS 2 810 as indicated by arrow 803.

Figure 8:
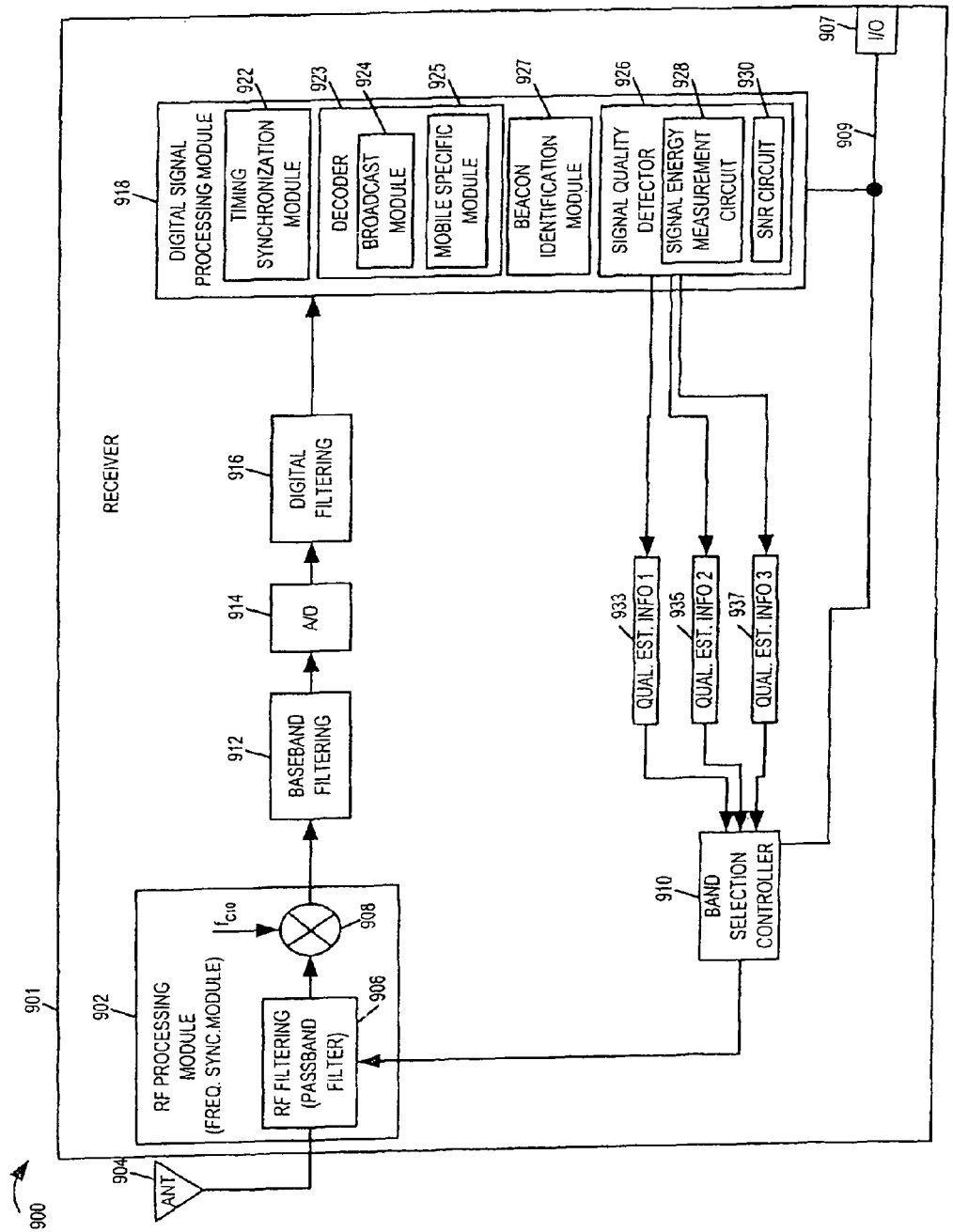
FIG. 8 is a drawing of another exemplary embodiment of a receiver implemented in accordance with the present invention, the receiver may be used in the wireless terminal shown in FIG. 7.

FIG. 8 is example of an exemplary wireless terminal receiver 901/antenna 902 combination 900 implemented in accordance with the present invention. The receiver/antenna combination 900 of FIG. 8 may be used as the receiver 302/antenna 312 combination in the WT 300 of FIG. 3 or the WT 801 of FIG. 7. Receiver 901 illustrates an exemplary embodiment of a receiver, in accordance with the invention, that can process multiple components of a received signal included in the same selected carrier band, each component conveying different information, e.g., information corresponding different carrier bands transmitted by different transmitters and/or different transmit antennas. The FIG. 8 embodiment is well suited where both signal components are communicated using the same technology, e.g., same type of modulation.

The receiver 901 of FIG. 8 uses a single RF processing chain which includes a single RF processing module (frequency synchronization module) 902. The receiver 901 is coupled to an antenna 904 which receives downlink signals from a plurality of sector/cell base station transmitters. The antenna 904 is coupled to the RF processing module 902. The RF processing module 902 includes a controllable RF filter 906 and a mixer circuit 908. The RF filter 906 may be implemented as a passband filter and serves as a frequency synchronization circuit. The RF processing module 902 has been tuned to a carrier frequency selected by a band selection controller 910. The RF filter passes received signal components within the selected carrier band and rejects at least some signal components outside the selected carrier band.

The received passband signal from the antenna 904 is input to the RF filter 906 and processed by a mixer circuit 908 resulting in a baseband signal. The resulting baseband signal is output from the RF processing module 902 and input to a baseband filter 912. The filtered output from the baseband filter 912 is input to an A/D convertor module 914, where analog to digital conversion is performed. The resulting output digital signal is input to a digital filter 916 for additional filtering. Then the output of the digital filter 916 is input to a digital signal processing module 918. The digital signal processing module 918 includes a timing synchronization module 922, a decoder 923, a beacon identification module 927, and a signal quality detector 926. Thus digital signal processing module 918 is capable of fully decoding broadcast as well as WT specific information, e.g., information intended for the individual WT and not other WTs.

The timing synchronization module 922 is used for timing synchronization of received data being processed, e.g., received downlink signals. The timing synchronization module 922 may implemented as a symbol timing recovery circuit using known techniques. The decoder 923 includes a broadcast module 924 for decoding received broadcast signals, e.g., assignment signals, pilot signals, etc., and a mobile specific module 925 for decoding received downlink data/information, e.g., downlink traffic signals, intended for the specific WT 300 (or WT 801) to which receiver 901 belongs.

The beacon identification module 927 identifies a received beacon signal being processed with a specific base station sector transmitter associated with a specific carrier frequency used for its primary downlink signaling. Each beacon signal may be, e.g., a signal occupying single OFDM symbol time with the total or nearly total sector transmitter energy concentrated on the one tone. Because of the characteristics of the OFDM beacon signals, the beacon identification module 927 can identify beacon signals, without having to process the signals through the timing synchronization module 922 or the decoder module 923.

The signal quality detector 926 includes a signal energy measurement circuit 928 and a SNR circuit 930. The signal quality detector 926 generates quality estimates for different channels, from a plurality of base station cell/sector transmitters to WT 300 based on measurements of the received identified beacon signals. The quality estimate is based on the signal energy measurement circuit 928 output and/or the SNR circuit 930 output which is a function of measured signal energy. Signal quality estimate information 933, 935, 937 e.g., quality indicator values, corresponding to each received identified beacon is forwarded to the band selection controller 910 to be used in making a band selection decision.

The signal component quality information (933, 935, 937) forwarded from the digital signal processing module 918 is used by the band selection controller 910 to make decisions concerning the settings of the carrier frequency band to be used by RF processing module 902, e.g., which band and thus, which base station sector transmitter, should be selected for receiving downlink communications.

Receiver 901 of FIG. 8 includes an I/O interface 907 coupled to digital signal processing module 918 and the band selection controller 910 via bus 509 over which the various elements may interchange data and information. In other embodiments, bus 509 may be coupled to other receiver components, e.g., digital filter 916. The receiver 901 may communicate with other elements of the WT 300 via I/O interface 907 which couples receiver 901 to bus 312. Decoded downlink traffic channel signals may be conveyed via interface 907, e.g., to one or more external devices such as a display and/or other WT components.

In FIG. 8, the output of band selection controller 910 is used to control the RF processing module 902. In other embodiments, the band selection controller 910 may be coupled to the digital filter 916 and/or the digital signal processing module 918, and the output of the band selection controller 910 can be used to control the digital filtering 916 and/or the digital signal processing module 918. In such cases, the RF processing module 902 receives and passes a wide portion of the received signal, e.g., multiple bands, and the digital filtering 916 and/or the digital signal processing module 918 selects a part of the received signal to further process and filter or discard the remaining part of the received signal in accordance with a control signal or signals received from the band selection controller 910.

Figure 9:
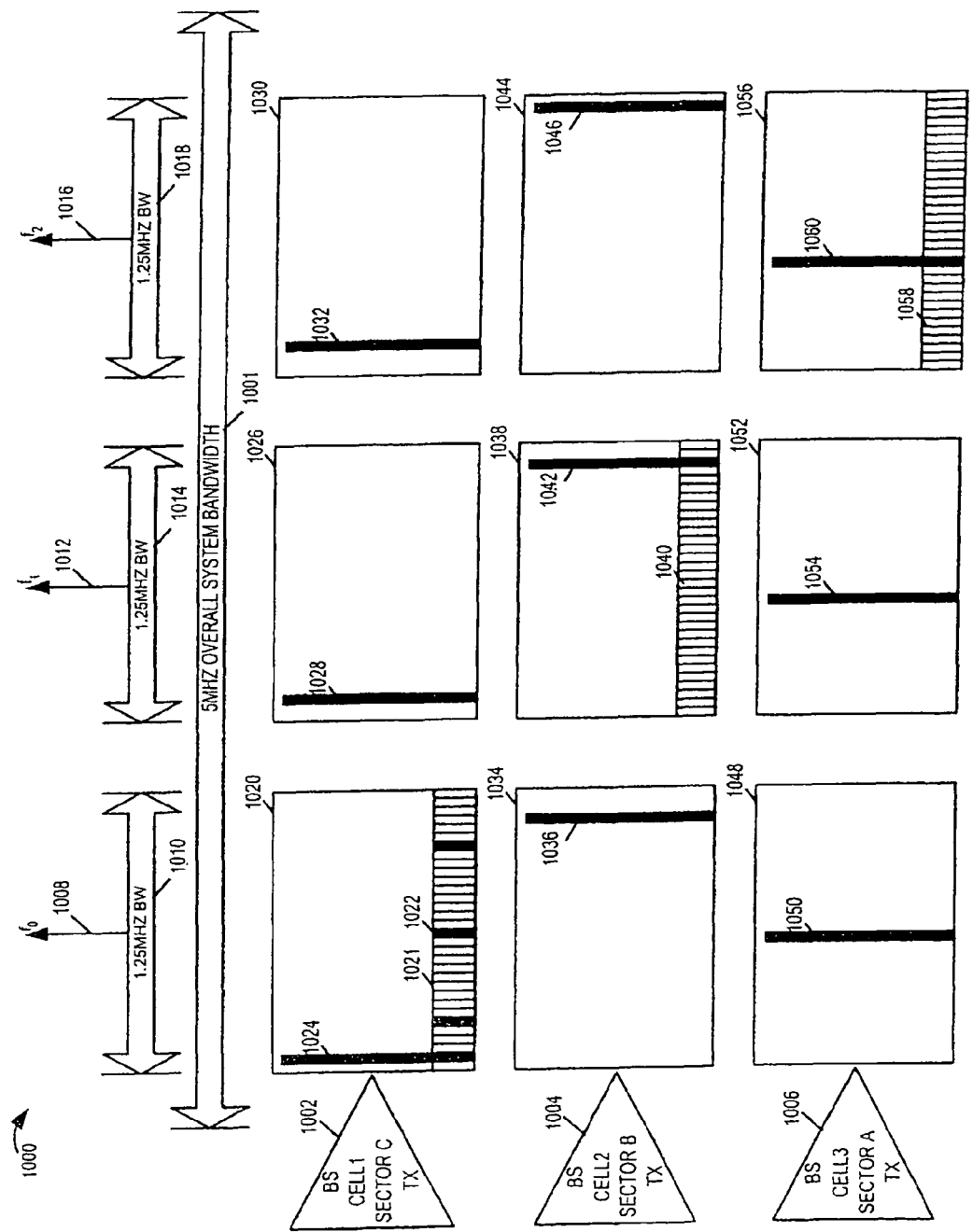
FIG. 9 is a drawing illustrating exemplary base station sector transmitter signaling including beacons corresponding to a sector transmitter, the beacons being transmitted into multiple bands in accordance with the present invention; the signaling may be transmitted from the exemplary base stations shown in FIG. 7.

FIG. 9 is a drawing 1000 illustrating exemplary transmitter signaling, in accordance with the invention. Assume that there is an exemplary wireless terminal, e.g., WT 801, in the exemplary three sectors per cell multi-cell wireless communications system 800 of FIG. 7 using an overall system BW of 5 MHz 1001. Assume the wireless terminal 801, e.g., a mobile node in motion, is currently situated in the system 800 such that it can receive: some signals from a BS cell 1 sector C transmitter 1002; some signals from a BS cell 2 sector B transmitter 1004, and some signals from a BS cell 3 sector transmitter 1006. Assume that the WT 801 was previously closest to transmitter 1002, but is now closest to transmitter 1004.

BS cell 1 sector C transmitter 1002 transmits downlink signals 1020 using carrier frequency $f_0$ 1008 within a 1.25 MHz BW band 1010. Signals 1020 include downlink traffic channel signals 1021 for WTs which are represented by small rectangles, and a beacon signal 1024 represented by a large shaded rectangle. Beacon signals have been depicted larger in size than ordinary signals to illustrate that beacon signals have a much higher transmission energy concentration on a per tone basis than an ordinary signal making such signals easy to detect. Downlink traffic signals 1022, e.g., a spread spectrum OFDM signal, intended for the specific WT of interest 801 have been shaded. In addition, BS cell 1 sector C transmitter 1002 transmits downlink signals 1026 into a 1.25 MHz frequency band 1014 with carrier frequency $f_1$ 1012. Downlink signals 1026 include a beacon signal 1028. BS cell 1 sector C transmitter 1002 also transmits downlink signals 1030 into a 1.25 MHz frequency band 1018 with carrier frequency $f_2$ 1016. Downlink signals 1030 include a beacon signal 1032. In this exemplary embodiment, the beacon signals (1024, 1028, 1032) and the ordinary signaling (1021) are transmitted by transmitter 1002 at different times. Most of the time, transmitter 1002 transmits ordinary downlink signaling 1021, but occasionally, e.g., periodically, transmitter 1002 transmits a beacon signal (1024, 1028, or 1032) in place of the ordinary signaling, with the total or nearly total sector transmission power being concentrated on the beacon signal. The timing sequence can be structured such that the transmitter 1002 cycles through beacons 1024, 1028, 1032, repetitively.

BS cell 2 sector B transmitter 1004 transmits downlink signals 1038 using carrier frequency $f_1$ 1012 within the 1.25 MHz BW band 1014. Signals 1038 include downlink traffic signals 1040 for WTs which are represented by small rectangles, and a beacon signal 1042 represented by a large shaded rectangle. In addition BS cell 2 sector B transmitter 1004 transmits downlink signals 1034 into frequency band 1010. Downlink signals 1034 include a beacon signal 1036. BS cell 2 sector B transmitter 1004 also transmits downlink signals 1044 into frequency band 1018. Downlink signals 1044 include a beacon signal 1046. In this exemplary embodiment, the beacon signals (1036, 1042, 1046) and the ordinary signaling (1040) are transmitted by transmitter 1004 at different times. Most of the time, transmitter 1004 transmits ordinary downlink signaling 1040, but occasionally, e.g., periodically, transmitter 1004 transmits a beacon signal (1036, 1042, or 1046) in place of the ordinary signaling, with the total or nearly total sector transmission power being concentrated on the beacon signal. The timing sequence can be structured such that the transmitter 1004 cycles through beacons 1036, 1042, 1046, repetitively.

BS cell 3 sector A transmitter 1006 transmits downlink signals 1056 using carrier frequency $f_2$ 1016 within the 1.25 MHz BW band 1018. Signals 1056 include downlink traffic signals 1058 for WTs which are represented by small rectangles, and a beacon signal 1060 represented by a large shaded rectangle. In addition BS cell 3 sector A transmitter 1006 transmits downlink signals 1048 into frequency band 1010. Downlink signals 1048 include a beacon signal 1050. BS cell 3 sector A transmitter 1006 also transmits downlink signals 1052 into frequency band 1014. Downlink signals 1052 include a beacon signal 1054. In this exemplary embodiment, the beacon signals (1050, 1054, 1060) and the ordinary signaling (1058) are transmitted by transmitter 1006 at different times. Most of the time, transmitter 1006 transmits ordinary downlink signaling 1058, but occasionally, e.g., periodically, transmitter 1006 transmits a beacon signal (1050, 1054, or 1060) in place of the ordinary signaling, with the total or nearly total sector transmission power being concentrated on the beacon signal. The timing sequence can be structured such that the transmitter 1006 cycles through beacons 1050, 1054, 1060, repetitively.

In this exemplary embodiment, each of the beacon signals (1024, 1028, 1032, 1036, 1042, 1046, 1050, 1054, 1060) are transmitted at the same transmission power level. In other embodiments, different transmission power levels may be used for different beacon signals, provided the WTs know the transmission power assigned to each beacon signal or know the relationships between the transmission power levels assigned to different beacon signals.

Figure 10:
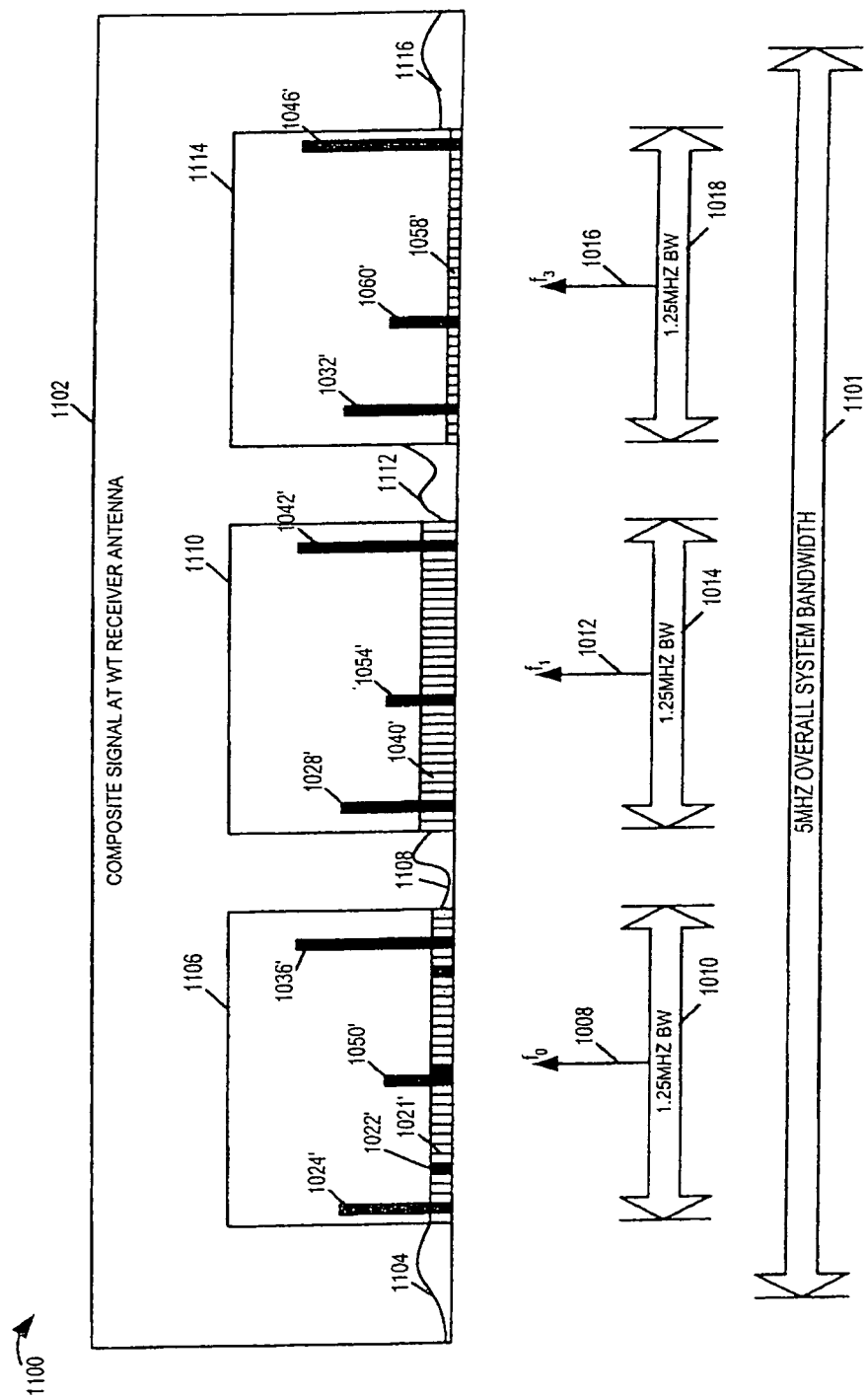
FIG. 10 is a drawing illustrating an exemplary received signal at the receiver of the exemplary wireless terminal shown in FIG. 7.

FIG. 10 is a drawing 1100 illustrating an exemplary composite signal 1002 at the receiver antenna of WT receiver 801 and associated frequency information. Signal 1102 include components 1104, 1106, 1108, 1110, 1112, 1114, and 1116. Components 1104, 1108, 1112, and 1116 represent noise signals outside the frequency bands of interest 1010, 1014, 1018.

Signals 1106 represents a composite received copy of signals 1020, 1034, and 1048 which were transmitted within band 1010 with carrier frequency $f_0$ 1008; signal 1106 also includes additional noise. Transmitted beacon signal 1024 and ordinary signaling 1021, 1022 have been moderately reduced in amplitude, e.g., due to channel gain, resulting in received signals (1024', 1021', 1022'). Transmitted beacon signal 1036 has been slightly reduced in amplitude, e.g., due to channel gain, resulting in received beacon signal 1036'. Beacon signal 1050 has been significantly reduced in amplitude, e.g., due to channel gain, resulting in received beacon signal 1050'. Similar to what is described with respect to FIG. 9, signals 1024', 1022' and 1021', 1050', and 1036' of FIG. 10 may be received at different time instants.

Signals 1110 represents a composite received copy of signals 1026, 1038, 1052 which were transmitted within band 1014 with carrier frequency $f_1$ 1012; signal 1110 also includes additional noise. Transmitted beacon signal 1042 and ordinary signaling 1040, have been slightly reduced in amplitude, e.g., due to channel gain, resulting in received signals (1042', 1040'). Transmitted beacon signal 1028 has been moderately reduced in amplitude, e.g., due to channel gain, resulting in received beacon signal 1028'. Transmitted beacon signal 1054 has been significantly reduced in amplitude, e.g., due to channel gain, resulting in received beacon signal 1054'.

Signals 1114 represents a composite received copy of signals 1030, 1044, 1056 which were transmitted within band 1018 with carrier frequency $f_2$ 1016; signal 1114 also includes additional noise. Transmitted beacon signal 1060 and ordinary signaling 1058, have been significantly reduced in amplitude. e.g., due to channel gain, resulting in received signals (1060', 1058'). Transmitted beacon signal 1032 has been moderately reduced in amplitude, e.g., due to channel gain, resulting in received beacon signal 1032'. Transmitted beacon signal 1046 has been slightly reduced in amplitude, e.g., due to channel gain, resulting in received beacon signal 1046'.

Figure 11:
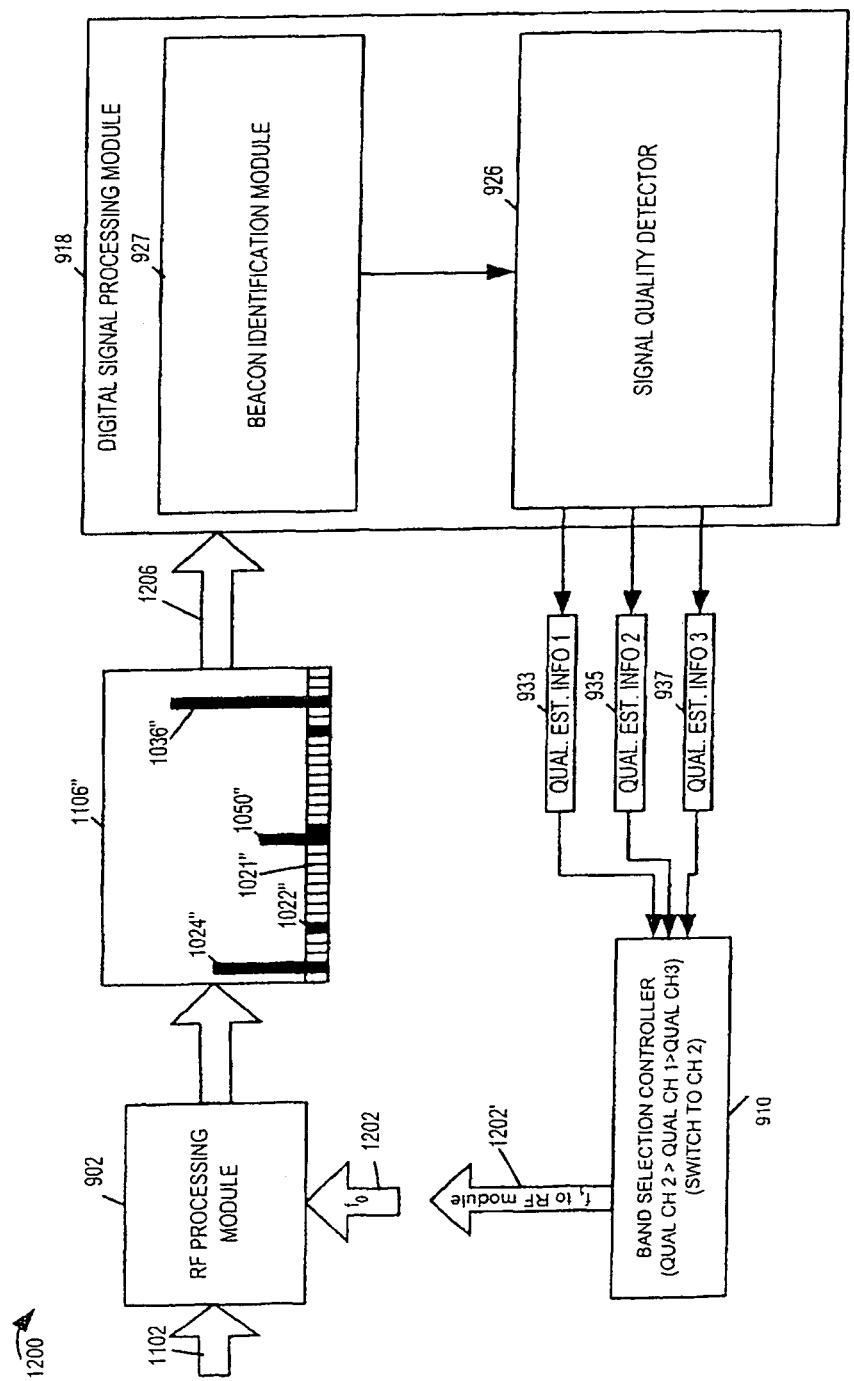
FIG. 11 is a drawing illustrating exemplary wireless terminal receiver processing of the exemplary received signal of FIG. 10, and exemplary band selection in accordance with the present invention.

FIG. 11 is a drawing 1200 illustrating exemplary processing by receiver 900 of FIG. 8 of exemplary composite received signal 1102 of FIG. 10 in accordance with the present invention. WT 801 including receiver 900 is currently attached to BS 1 sector 3 using transmitter 1002 for downlink traffic signaling, and therefore RF processing module 902 is being controlled by signal 1202 from band controller 910 to select band 1010 with carrier frequency $f_0$ 1008. RF processing module 902 extracts baseband signal 1106' from signal 1102, a filtered representation of the information included in signals 1106. Signals 1106' includes ordinary signaling 1021", ordinary signaling directed specifically for WT 801 1022", and beacon signals 1024", 1036", 1050", corresponding to signals (1021', 1022', 1024', 1036', 1050'), respectively.

Arrow 1206 represents additional processing, e.g., baseband filtering, A/D conversion, and digital filtering, by the receiver chain components 912, 914, 916. Then, the signals are input to the digital signal processing module 918. Beacon identification module 927 identifies beacon signal 1024" as being associated with cell 1 sector C transmitter 1002 which uses carrier frequency $f_0$ 1008 and band 1010 as its assigned band for downlink traffic channel communications. Beacon identification module 927 identifies beacon signal 1036" as being associated with cell 2 sector B transmitter 1004 which uses carrier frequency $f_1$ 1012 and band 1014 as its assigned band for downlink traffic channel communications. Beacon identification module 927 identifies beacon signal 1050" as being associated with cell 3 sector A transmitter 1006 which uses carrier frequency $f_2$ 1016 and band 1018 as its assigned band for downlink traffic channel communications.

The identified beacon information and the beacon signals 1024", 1036", and 1050" as forwarded to the signal quality detector 926, where energy content and/or SNR information are obtained and quality estimation information (933, 935, 937) corresponding to the beacons signals (1024", 1036", 1050") is generated. In this OFDM embodiment, the beacon identification, beacon signal measurements, and signal quality information generation are performed without using a timing synchronization module or having to decode modulated information from the beacon signal. In other embodiments, information may be modulated on the beacons signals, and a broadcast decode module may be used. In addition, in other embodiments, additional information may be considered in generating the quality estimation values. For example, error rates on decoded information from received ordinary signals 1022", e.g., downlink traffic channel signals intended for specific WT 801, may be considered when evaluating the quality of the channel corresponding to beacon signal 1024". In addition, where different detected beacon signals may correspond to the same carrier, e.g., from another cell, ratios between the beacon signals may be used in determining interference levels.

Quality estimate information 1 933 is based on the energy and/or SNR estimates of the processed beacon signal 1024", and corresponds to transmitter 1002 using carrier frequency $f_0$. Quality estimate information 2 935 is based on the energy and/or SNR estimates of the processed beacon signal 1036", and corresponds to transmitter 1004 using carrier frequency $f_1$. Quality estimate information 1 937 is based on the energy and/or SNR estimates of the processed beacon signal 1050", and corresponds to transmitter 1006 using carrier frequency $f_2$.

Band selection controller receives information 933, 935, and 937, decides that the quality of channel 2 is better than the quality of channel 1 which is better than the quality of channel 3 and that WT 801 should change its attachment point. At the appropriate time, e.g., to minimize disruption in service, band selection controller 910 sends signal 1202' to RF processing module 902 to change the selection to frequency $f_1$.

Figure 12:
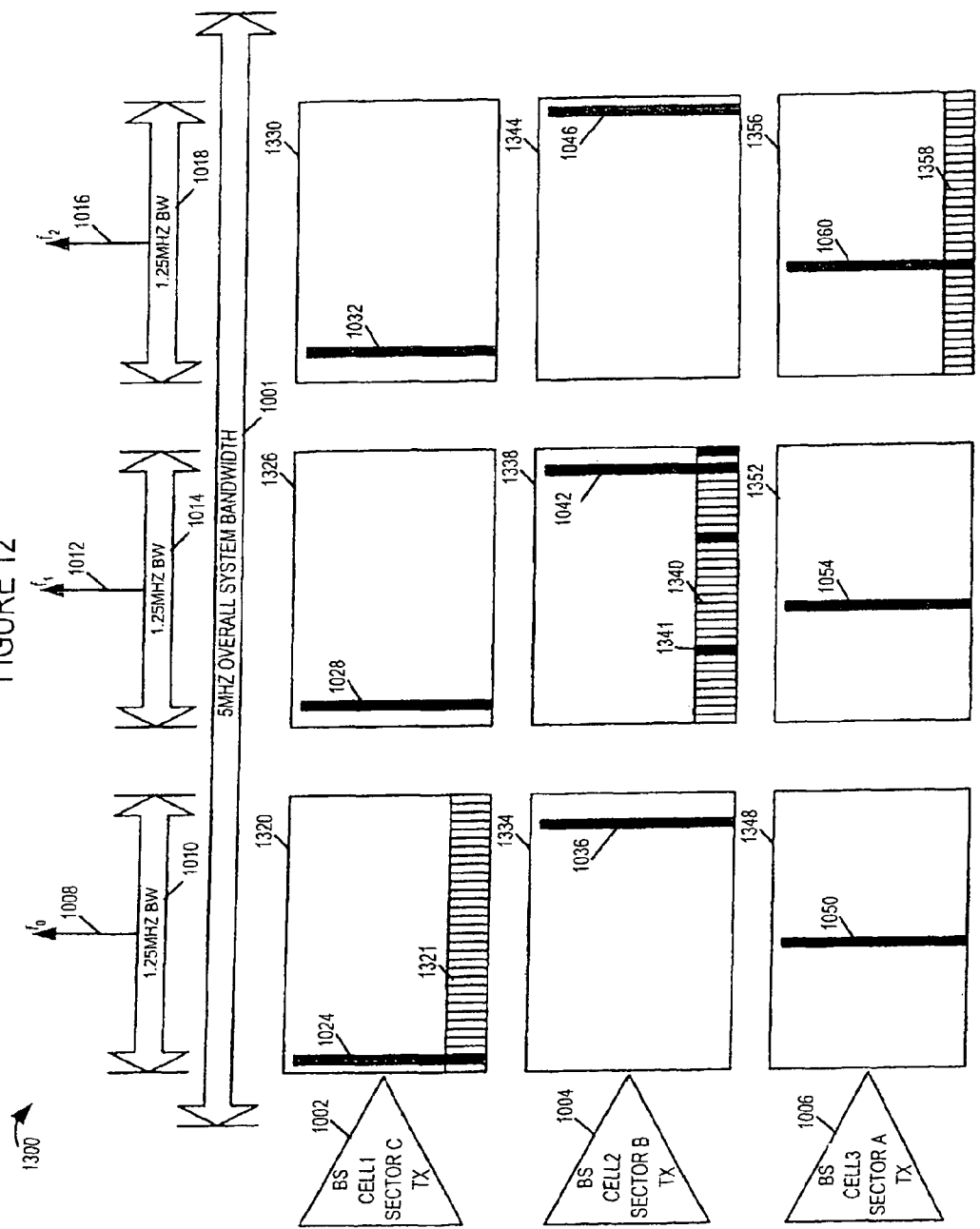
FIG. 12 is a drawing illustrating exemplary base station sector transmitter signaling including beacons corresponding to a sector transmitter, the beacons being transmitted into multiple bands in accordance with the present invention, the signaling may be transmitted from the exemplary base stations shown in FIG. 7 after the wireless terminal has selected a new band and changed the attachment point.

FIG. 12 is a drawing 1300 illustrating exemplary transmitter signaling after the WT 801 has changed it band selection and attachment point. The WT 801 can receive some signals from: BS cell 1 sector C transmitter 1002, some signals from BS 2 sector B transmitter 1004, and some signals from BS 3 sector transmitter 1006. Assume that the WT 801 was previously closest to transmitter 1002, but is now closest to transmitter 1004.

BS cell 1 sector C transmitter 1002 transmits downlink signals 1320 using carrier frequency $f_0$ 1008 within band 1010. Signals 1320 include downlink traffic signals traffic signals 1321 for WTs which are represented by small rectangles, and a beacon signal 1024 represented by a large shaded rectangle. In addition BS cell 1 sector C transmitter 1002 transmits downlink signals 1326 into frequency band 1014 with carrier frequency $f_1$ 1012. Downlink signals 1326 include a beacon signal 1028. BS cell 1 sector C transmitter 1002 also transmits downlink signals 1330 into frequency band 1018 with carrier frequency $f_2$ 1018. Downlink signals 1330 include a beacon signal 1032.

BS cell 2 sector B transmitter 1004 transmits downlink signals 1338 using carrier frequency $f_1$ 1012 within band 1014. Signals 1338 include downlink traffic signals traffic signals 1340 for WTs which are represented by small rectangles including downlink traffic signals for specific WT 801 1341 represented by small rectangles with shading, and a beacon signal 1042 represented by a large shaded rectangle. In addition BS cell 2 sector B transmitter 1004 transmits downlink signals 1334 into frequency band 1010. Downlink signals 1034 include a beacon signal 1036. BS cell 2 sector B transmitter 1004 also transmits downlink signals 1344 into frequency band 1018. Downlink signals 1344 include a beacon signal 1046.

BS cell 3 sector A transmitter 1006 transmits downlink signals 1356 using carrier frequency $f_2$ 1016 within band 1018. Signals 1356 include downlink traffic signals traffic signals 1358 for WTs which are represented by small rectangles, and a beacon signal 1060 represented by a large shaded rectangle. In addition BS cell 3 sector A transmitter 1006 transmits downlink signals 1348 into frequency band 1010. Downlink signals 1348 include a beacon signal 1050. BS cell 3 sector A transmitter 1006 also transmits downlink signals 1352 into frequency band 1014. Downlink signals 1352 include a beacon signal 1054.

Figure 13:
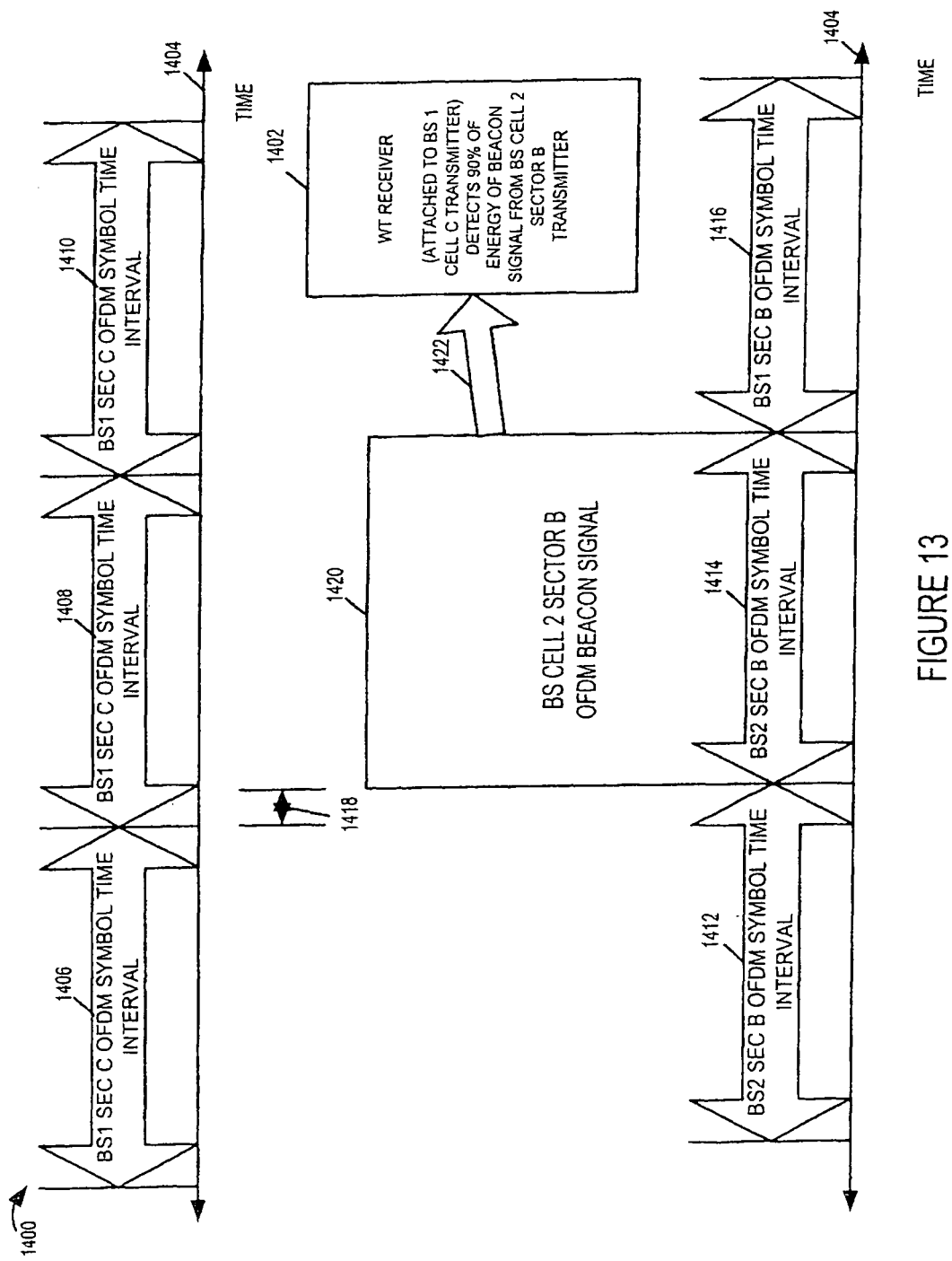
FIG. 13 is an illustration of an exemplary beacon signal with a timing offset with respect to an adjacent sector, used for the purposes of further explaining features of the invention.

FIG. 13 is a drawing 1400 of an exemplary beacon signal 1420 with a timing offset 1418 with respect to an adjacent sector, illustrated for the purposes of further explaining features of the invention. FIG. 13 includes an exemplary WT 1402 implemented in accordance with the present invention, e.g., WT 801 of FIG. 7. Assume that the exemplary system is an OFDM spread spectrum frequency hopped system, using beacon signaling in accordance with the present invention. Assume that time line 1404 represents time at the WT receiver 1402, that the WT 1402 is currently attached to BS 1 sector C transmitter, whose carrier frequency band is currently being used for downlink traffic channel signaling, and that the WT 1402 has synchronized OFDM symbol timing with respect to the BS 1 sector C transmitter. Three successive OFDM symbol time intervals (1406, 1408, 1410) are shown for BS 1 sector C transmitter communications. Similarly, three successive OFDM symbol time intervals (1412, 1414, 1416) are shown for BS 2 sector B transmitter communications. Each OFDM symbol time interval (1406, 1408, 1410, 1412, 1414, 1416) is approximately the same duration; however, there is a 10% offset 1418 between the start of a BS 1 sector C OFDM symbol time interval and the start of a BS 2 sector B OFDM symbol time interval. This timing offset could be due, e.g., to differences between the base station timing generators such as different precise start times and/or differences due to different distances between WT 1402 and each base station transmitter.

BS cell 2 sector B OFDM beacon signal 1420 has been communicated to WT 1402 as indicated by arrow 1422. During time interval 1414 BS cell 2 sector B OFDM beacon signal 1420 is present at the WT receiver 1402. However, since the WT is attached and synchronized with respect to BS 1 sector C transmitter, WT 1402 only detects 90% of the energy of the beacon signal 1420, e.g., it misses the last 10% of the signal. However, this relatively high level of energy detection and relatively small amount of associated uncertainty is, in many cases, satisfactory with regard to supporting a comparison of beacon signals from adjacent cell and or sectors. In accordance, with the invention, in many OFDM embodiments, the receiver does riot need to resynchronize the receiver with respect to timing for each beacon signal being processed.

While described primarily in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, carrier band selection, digital signal processing, energy detection/SNR detection, decoding, timing synchronization, signal quality detection, etc. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method, the method comprising:
receiving a signal at a receiver, said signal including a first signal component received in a first frequency band from a first base station wirelessly transmitting to the receiver and a second signal component received in the first frequency band from a second base station wirelessly transmitting to the receiver primarily over a second frequency band and occasionally over the first frequency band, wherein each of the first base station and the second base station comprises a wireless communication station installed at a fixed geographic location, and the receiver is a geographically unfixed wireless receiver;
determining a first signal quality indicator based on the first signal component;
determining a second signal quality indicator based on the second signal component; and
selecting at the receiver, as a function of said first and second signal quality indicators, between the receiver operating using the first base station and the first frequency band and the receiver operating using the second base station and the second frequency band;
wherein the second signal quality indicator is determined based on information received at the receiver from the second base station over the first frequency band without the receiver switching from receiving over the first frequency band to receiving over the second frequency band.

2. The communications method of claim 1, wherein:
determining the first signal quality indicator includes operating a first module to:
generate a data error rate; and
generate the first signal quality indicator based on the generated data error rate; and
wherein determining the second signal quality indicator includes operating a second module to:
generate the second signal quality indicator from a measurement of the energy of said second signal component without generating a data error rate corresponding to the second signal component.

3. The communications method of claim 2,
wherein determining the first signal quality indicator includes operating the first module to:
decode data received in the first signal component; and
wherein said second module does not decode data.

4. The communications method of claim 3, wherein said first and second signal components correspond to base stations which use different modulation methods to communicate user data.

5. The communications method of claim 4, wherein one of said first and second signal components is from a base station which communicates user data using OFDM signaling and the other one of the first and second signal components is from a base station which uses CDMA signaling.

6. The method of claim 1, wherein said selecting is performed differently when said first and second quality indicators are above a threshold than when only one of said first and second quality indicators are above threshold.

7. The method of claim 6, wherein said selecting includes:
selecting a frequency band corresponding to a lower signal quality value when the first signal quality indicator and the second signal quality indicator both exceed a threshold for a preselected interval.

8. The method of claim 7, wherein said selecting includes:
selecting a frequency band corresponding to a higher signal quality value when one of the first signal quality indicator and second signal quality indicator is below a predetermined threshold.

9. A communications device, comprising:
a receiver for receiving a signal in a first frequency band, said signal including a first signal component received in the first frequency band from a first base station wirelessly transmitting to the receiver and a second signal component received in the first frequency band from a second base station wirelessly transmitting to the receiver primarily over a second frequency band and occasionally over the first frequency band, wherein each of the first base station and the second base station comprises a wireless communication station installed at a fixed geographic location, and the receiver is a geographically unfixed wireless receiver;
wherein the communications device is configured to determine a first signal quality indicator based on the first signal component, determine a second signal quality indicator based on the second signal component, and select, as a function of said first and second signal quality indicators, between the receiver operating using the first base station and the first frequency band and the receiver operating using the second base station and the second frequency band;
wherein the second signal quality indicator is determined based on information received at the receiver from the second base station over the first frequency band without the receiver switching from receiving over the first frequency band to receiving over the second frequency band.

10. The communications device of claim 9, wherein the communications device is further configured to generate a data error rate and measure the energy of said second signal component.

11. The communications device of claim 10, wherein the communications device is further configured to perform a decoding operation on the second signal component.

12. The communications device of claim 11, wherein said first and second signal components correspond to base stations which use different modulation methods to communicate user data.

13. The communications device of claim 12, wherein one of said first and second signal components is from a base station which communicates user data using OFDM signaling and the other one of the first and second signal components is from a base station which uses CDMA signaling.

14. A communications device, comprising:
means for receiving a signal in a first frequency band, said signal including a first signal component received in the first frequency band from a first base station wirelessly transmitting to the means for receiving and a second signal component received in the first frequency band from a second base station wirelessly transmitting to the means for receiving primarily over a second frequency band and occasionally over the first frequency band, wherein each of the first base station and the second base station comprises a wireless communication station installed at a fixed geographic location, and the means for receiving is a geographically unfixed means for receiving;

wherein the communications device is further configured to determine a first signal quality indicator based on the first signal component, determine a second signal quality indicator based on the second signal component, and select, as a function of said first and second signal quality indicators, between operating using the first base station and the first frequency band and operating using the second base station and the second frequency band;

wherein the second signal quality indicator is determined based on information received at the means for receiving from the second base station over the first frequency band without the means for receiving switching from receiving over the first frequency band to receiving over the second frequency band.

15. The communications device of claim 14, wherein the communication device is further configured to generate a data error rate and generate the second signal quality indicator from a measurement of the energy of said second signal component without generating a data error rate corresponding to the second signal component.

16. The communications device of claim 15, wherein said communications device is configured to decode data received in the second signal component.

17. The communications device of claim 16, wherein said first and second signal components correspond to base stations which use different modulation methods to communicate user data.

18. A non-transitory machine readable medium including machine executable instructions for controlling a communications device, the machine readable medium comprising:

instructions for causing a machine to receive a signal in a first frequency band, said signal including a first signal component received in the first frequency band from a first base station wirelessly transmitting to the machine and a second signal component received in the first frequency band from a second base station wirelessly transmitting to the machine primarily over a second frequency band and occasionally over the first frequency band, wherein each of the first base station and the second base station comprises a wireless communication station installed at a fixed geographic location, and the machine is a geographically unfixed machine;

instructions for causing the machine to determine a first signal quality indicator based on the first signal component;

instructions for causing the machine to determine a second signal quality indicator based on the second signal component; and instructions for causing the machine to select, as a function of said first and second signal quality indicators, between the machine operating using the first base station and the first frequency band and the machine operating using the second base station and the second frequency band;

wherein the second signal quality indicator is determined based on information received at the machine from the second base station over the first frequency band without the machine switching from receiving over the first frequency band to receiving over the second frequency band.

19. A communications device, comprising:

a processor configured to control the communications device to:

receive a signal in a first frequency band at a receiver, said signal including a first signal component received in the first frequency band from a first base station wirelessly transmitting to the receiver and a second signal component received in the first frequency band from a second base station wirelessly transmitting to the receiver primarily over a second frequency band and occasionally over the first frequency band, wherein each of the first base station and the second base station comprises a wireless communication station installed at a fixed geographic location, and the communications device is a geographically unfixed communications device;

determine a first signal quality indicator based on the first signal component;

determine a second signal quality indicator based on the second signal component; and select, at the processor, as a function of said first and second signal quality indicators, between the receiver operating using the first base station and the first frequency band-and the receiver operating using the second base station and the second frequency band;

wherein the second signal quality indicator is determined based on information received at the receiver from the second base station over the first frequency band without the receiver switching from receiving over the first frequency band to receiving over the second frequency band.

* * * * *